United States Patent
Nakano

(10) Patent No.: US 8,345,309 B2
(45) Date of Patent: Jan. 1, 2013

(54) SECURE PRINTING-OUT USING COLOR TONER AND PARTICULAR TONER

(75) Inventor: Toshimitsu Nakano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 493 days.

(21) Appl. No.: 12/720,154

(22) Filed: Mar. 9, 2010

(65) Prior Publication Data

US 2010/0231976 A1    Sep. 16, 2010

(30) Foreign Application Priority Data

Mar. 12, 2009   (JP) ................. 2009-059578

(51) Int. Cl.
- *H04N 1/21* (2006.01)
- *H04N 1/56* (2006.01)
- *H04N 1/64* (2006.01)

(52) U.S. Cl. ........ 358/1.9; 358/1.16; 358/501; 358/524; 358/530; 358/539

(58) Field of Classification Search ................... 358/501, 358/502, 515, 518–521, 522, 524–530, 300, 358/444, 404, 1.9, 1.16, 1.17, 539; 347/115

See application file for complete search history.

(56) References Cited

U.S. PATENT DOCUMENTS

| 8,189,246 B2 * | 5/2012 | Washino | .............. 358/1.9 |
| 2006/0056713 A1 | 3/2006 | Ito et al. | |

FOREIGN PATENT DOCUMENTS

JP   2006-86649   3/2006

* cited by examiner

*Primary Examiner* — Scott A Rogers

(74) *Attorney, Agent, or Firm* — Fitzpatrick, Cella, Harper & Scinto

(57) ABSTRACT

An image processing apparatus forming an image with color toners used for full color printing and a particular toner is provided. The apparatus comprises a storage storing image data and attribute information indicating an attribute of each pixel in the data; a compression component compressing the information; a change component changing attribute information except particular toner information for forming an image with the particular toner of the attribute information, so that a data amount of the compressed attribute information does not exceed the storage capacity, when a data amount of the compressed attribute information exceeds the storage capacity; a component storing the attribute information changed by the change component into the storage; and a component forming a full color image and a particular toner image by image processing using the attribute information in the storage for the image data in the storage.

10 Claims, 30 Drawing Sheets

| ATTRIBUTE SIGNAL 8bit | IMPORTANCE |
|---|---|
| bit 7 — PDL/SCAN | 5 |
| bit 6 — CLEAR | UNCHANGEABLE |
| bit 5 — ATTRIBUTE F | 1 |
| bit 4 — ATTRIBUTE E | 3 |
| bit 3 — ATTRIBUTE D | 2 |
| bit 2 — COLOR/MONO | 4 |
| bit 1 — CHARACTER/PHOTO | 7 |
| bit 0 — GRAPHIC | 6 |

FIG.25

SECURE PRINTING-OUT USING COLOR TONER AND PARTICULAR TONER

BACKGROUND OF THE INVENTION

1. Field of the Invention

The present invention relates generally to image processing in a printing apparatus and particularly to image processing for automatically carrying out many complicated settings required for realizing a visual effect selection in printing-out using a color toner and a particular toner.

2. Description of the Related Art

Recently, a digital printing technology has surely increased its utility value in the on-demand printing market and the document printing market for small number of volumes. Particularly full color printing using an electrophotographic technology is rapidly obtaining a bigger market because of the advantage thereof over the other printing technology in an aspect such as productivity, printing cost and maintainability. Among the technologies, particularly in addition to the full color printing by the conventional electrophotographic printing using basic four color tonners of CMYBk, a multi-color printing method further using a particular toner is getting attention and obtaining a bigger share in a particular printing market which requires a high on-demand capability and real-time capability. The particular tonner includes, for example, a transparent toner which can absorb irregularity on the surface of printed material to achieve a high gloss, and a light toner which can suppress roughness in a highlighted part. By using the particular toner, it becomes possible to obtain a new added value different from that of the typical digital printing and further widen the digital printing world. On such a background, a color composite machine (hereinafter, MFP) mounting a particular toner is being introduced into the market.

The MFP retains image data and attribute information corresponding to each pixel of the image data in a memory, performs image processing on the image data according to the attribute information, and carries out printing. For mounting the particular toner, the MFP develops print data of the particular toner into a binary drawing pattern and combines the data with the attribute information. The MFP performs the image processing on the image data such as color conversion and screen processing according to the attribute information, generates a drawing pattern of the basic four color toners of CMYBk, and takes out the particular toner drawing pattern combined with the attribute information. Then, the MFP sends the basic four color drawing pattern and the particular toner drawing pattern to a print engine for carrying out printing.

The memory for retaining the image data and the attribute information has predetermined storage capacity limit for each of the image data and the attribute information. Accordingly, the image data is compressed for retention by lossy compression so as to have a data amount smaller than the predetermined storage capacity. Meanwhile, the attribute information is compressed by lossless compression to prevent bit loss and sometimes the attribute information amount exceeds the predetermined capacity. For processing the case of exceeding the predetermined capacity, Japanese Patent Laid-Open No. 2006-086649 proposes a technique which increases a compression rate by masking (replacing by a specific value) each bit of the attribute information and thereby reduces the attribute information amount to that smaller than the predetermined capacity for storing.

However, in the technique of the above patent publication, since the particular toner drawing pattern is combined with the attribute information for retention, there is a problem that the particular toner drawing pattern information is erased and the particular toner printing cannot be carried out when each bit of the attribute information is masked.

SUMMARY OF THE INVENTION

The present invention present an image processing apparatus that forms an image using with color toners and a particular toner different from the color tonners. The color tonners are used for full color printing of cyan, magenta, yellow and black. The particular toner is used for particular toner printing. The apparatus comprises a storage component storing image data and attribute information indicating an attribute of each pixel in the image data; a compression component compressing the attribute information; a change component configured to change attribute information except particular toner information for forming an image with the particular toner of the attribute information, so that a data amount of the compressed attribute information does not exceed a storage capacity of the storage component, when a data amount of the compressed attribute information exceeds the storage capacity; a component storing the attribute information changed by the change component into the storage component; and a component forming a full color image and a particular toner image by performing image processing using the attribute information stored in the storage component for the image data stored in the storage component.

According to the present invention, even when the mask processing of attribute information is required for reducing the information amount of the attribute information to that smaller than a predetermined capacity, it is possible to increase the compression rate while retaining the particular toner information and to increase the possibility of carrying out the printing of the basic four colors necessary for full color printing and the particular toner.

According to the present invention, further, even when the data amount of the attribute information cannot be reduced to that smaller than the predetermined capacity while retaining the particular toner information, it is possible to securely carryout the particular toner printing by performing two stage printing.

Further features of the present invention will become apparent from the following description of exemplary embodiments (with reference to the attached drawings).

BRIEF DESCRIPTION OF THE DRAWINGS

FIG. 25 is a diagram showing an importance level of an attribute signal;

DESCRIPTION OF THE EMBODIMENTS

Hereinafter, with reference to the drawings, there will be described Embodiments 1 to 4 which use color toners necessary for full color printing and a transparent toner to achieve a high glossy of a printed material as a particular toner different from the color tonners. These embodiments do not limit the present invention and a toner except the transparent toner may be used as the particular toner.

<Embodiment 1>

Figure 1:
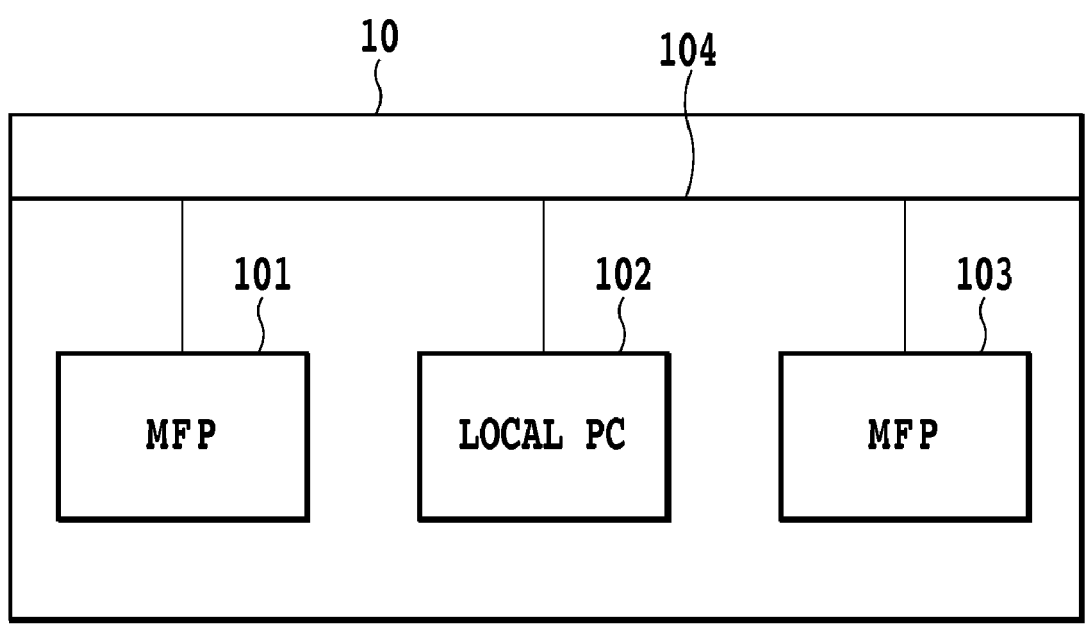
FIG. 1 is a block diagram showing an image processing system according to the present invention.

FIG. 1 is a block diagram showing an image processing apparatus according to the present invention.

To a LAN 104 built in an office 10, there are connected multi-function peripherals (hereinafter, MFP) 101 and 103 as image processing apparatuses each having an image forming apparatus of a printer and an image reading apparatus, and a local PC 102. The MFP 101 or 103 performs image processing on an input image read from a document image. Then, the result of the image processing is printed by the MPF which has read the document image.

After the image processing is performed on the document image read by the MFP 101, the MFP 103 may print the image. Further, the MFP 101 or 103 can interpret the Page Description Language (hereinafter, PDL) transmitted from the local PC 102 and carry out printing.

Further, another MFP (not shown in the drawing) is connected to another LAN (not shown schematically).

[MFP]

Figure 2:
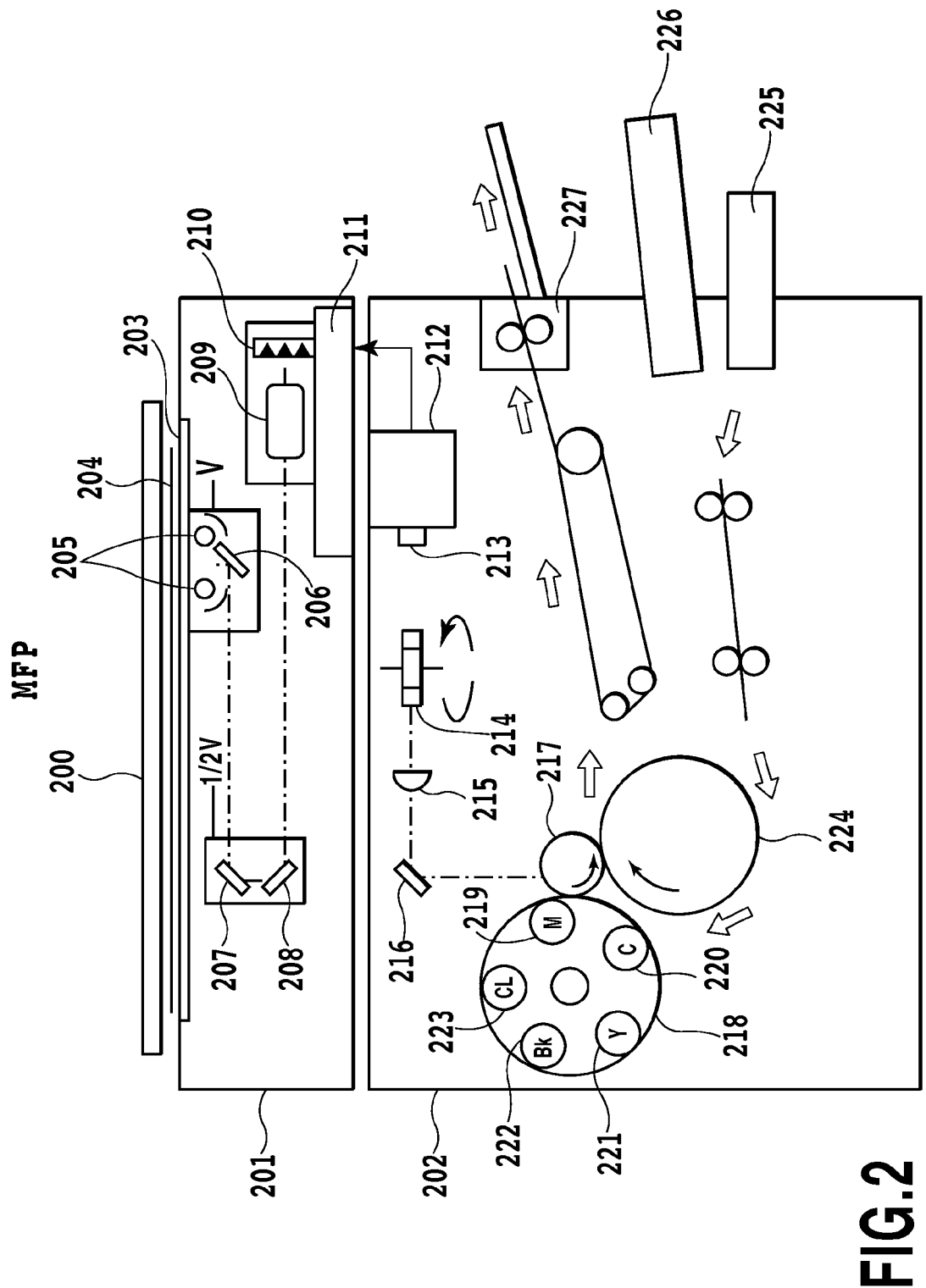
FIG. 2 is a block diagram showing an MPF according to the present invention.

FIG. 2 is a diagram schematically showing an MFP structure. In FIG. 2, an image scanner (image reading unit) 201 including a mirror face press plate 200 reads a document image and performs digital signal processing. Further, a printer unit 202 performing image formation prints an image corresponding to the document image read by the image scanner 201 on a sheet as a full color image.

A document 204 on a platen 203 reflects light emitted from a lamp 205 and the reflected light is guided to mirrors 206, 207 and 208. Further, the reflected light is focused by a lens 209 to form an image on a CCD image sensor 210 which is a 3-line solid state imaging device, and three image signals of red (R), green (G) and blue (B) are sent to a data processing unit 211 as full color information. Note that the lamp 205 and the mirror 206 move in a speed of V and the mirrors 207 and 208 move in a speed of ½ V mechanically in a vertical direction against an electric scanning (main scanning) direction of a line sensor and thereby the whole surface of the document is scanned (sub-scanning). The document 204 is read in a resolution of 600 dpi (dot/inch) in both of the main scanning and sub-scanning. The signal of the read image is stored in an internal data storage unit within the data processing unit 211 as image data having one page data of the document as one unit.

The data processing unit 211 processes the image data, which is stored in the data storage unit, electrically in a unit of a pixel, decomposes the image data into respective basic four color components of magenta (M), cyan (C), yellow (Y) and black (Bk), and sends the decomposed image data to the printer unit 202. Further, the data processing unit 211 generates clear image data (CL) internally in a unit of a pixel and sends the generated data also to the printer unit 202.

The sent image signals of M, C, Y, Bk and CL are sent to a laser driver 212. The laser driver 212 drives a semiconductor laser 213 for modulation according to the sent image signals. The laser beam from the semiconductor laser 213 is guided through a polygon mirror 214, an f-θ lens 215, and a mirror 216 and scans the surface of a photo-sensitive drum 217. Here, the image signal is written into a photoreceptor on the photo-sensitive drum 217 in a resolution of 600 dpi (dot/inch) the same as the reading resolution in both of the main scanning and sub-scanning.

A rotating developer 218 includes a magenta development unit 219, a cyan development unit 220, a yellow development unit 221, a black development unit 222, and a clear (transparent) development unit 223. Then, each of the five development units 219 to 223 contacts the photo-sensitive drum alternately and visualizes an electrostatic latent image formed on the photo-sensitive drum by development using corresponding color tonner.

A sheet supplied from a sheet cassette 225 or a sheet cassette 226 is wound around a transfer drum 224 and the visual image on the photo-sensitive drum 217 is transferred onto the sheet.

After the images of the five colors, CMYBk and CL (transparent), have been transferred sequentially onto the sheet by similar processes, the sheet passes through a fixing unit 227 to fix the toners thereon and then the sheet is discharged.

[Local PC]

Figure 3:
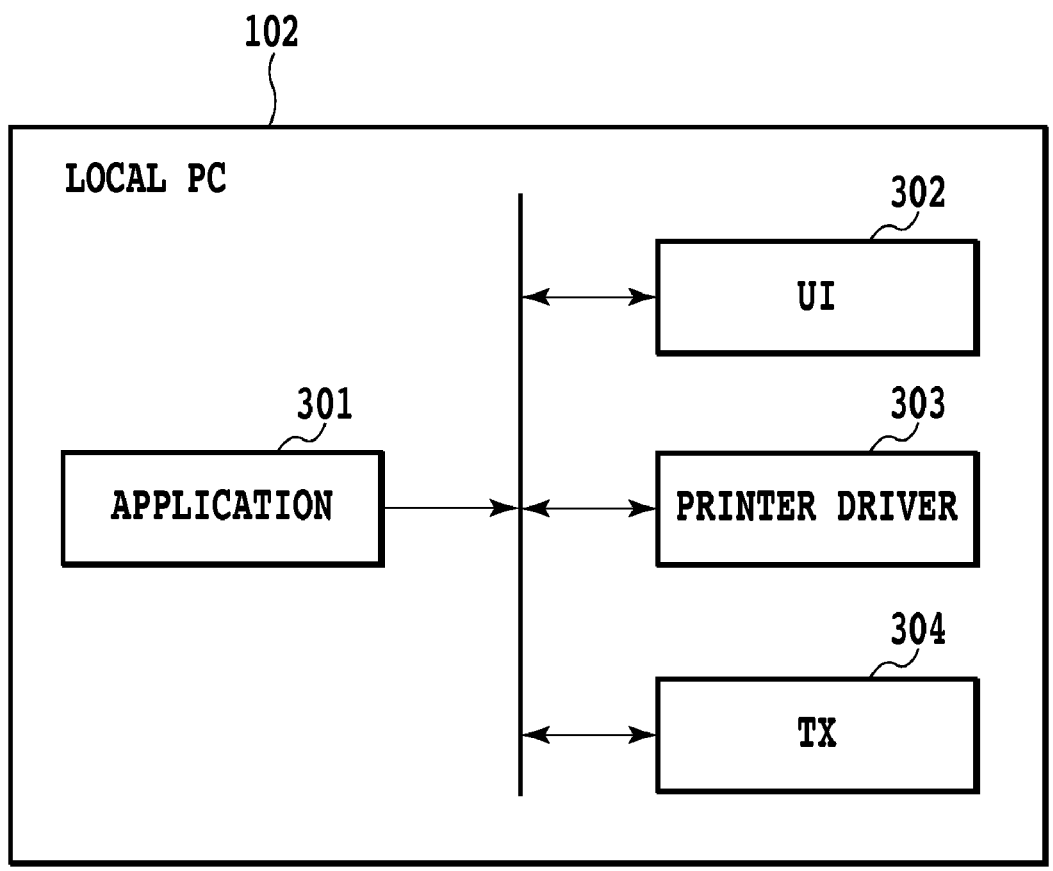
FIG. 3 is a diagram showing a configuration of a local PC.

FIG. 3 is a diagram showing a configuration of the local PC 102.

When a user prints data generated by an application 301, a printer driver UI unit 302 transmits a print instruction to a printer driver 303. The instructed printer driver 303 generates PDL data from the data of the application 301. A transmission unit 304 transmits the generated PDL data to the MFP 101 and/or the MFP 103.

[Data Processing Unit 211]

Figure 4:
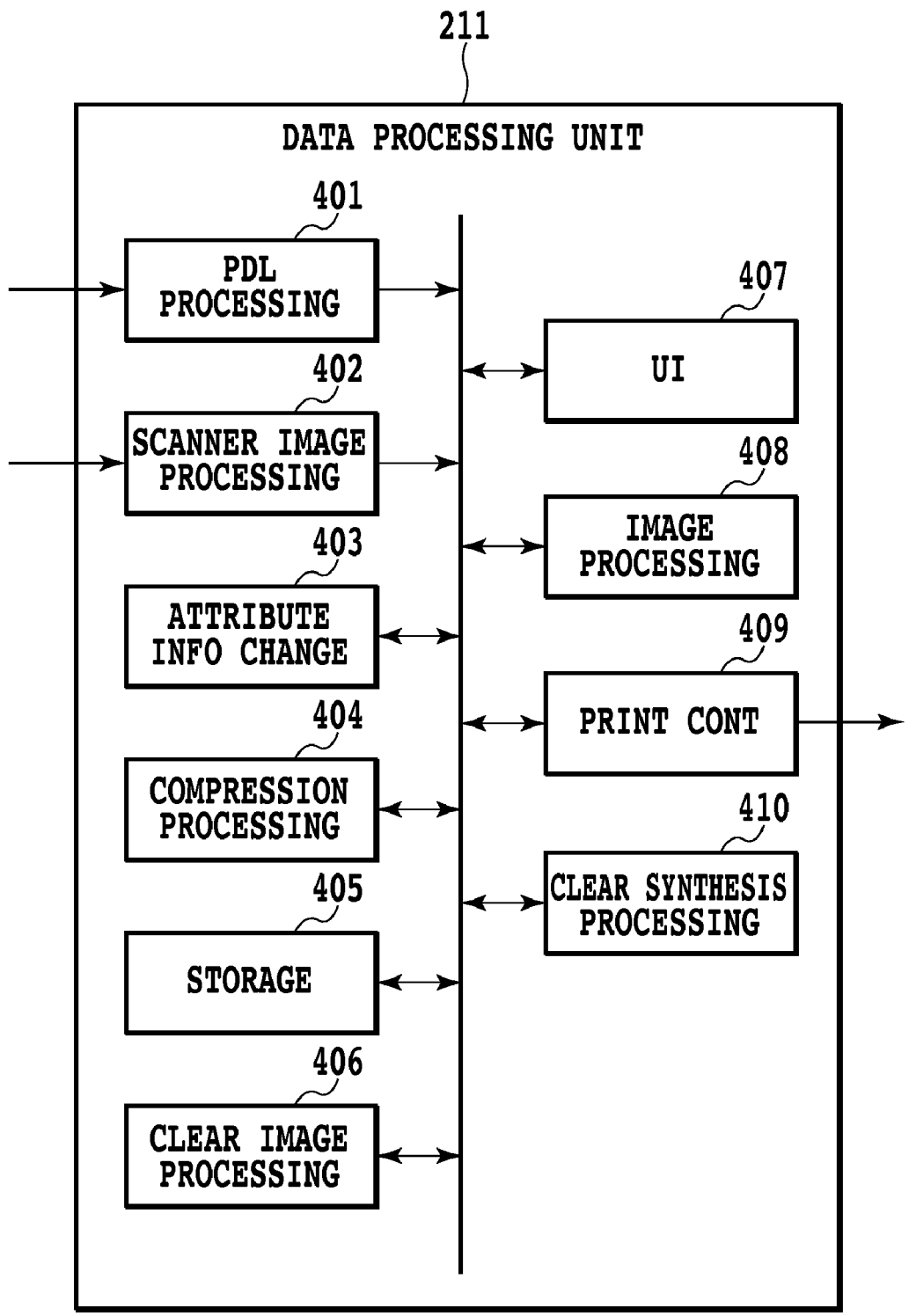
FIG. 4 is a diagram showing a configuration of a data processing apparatus.

FIG. 4 shows a configuration of the data processing unit 211 mounted on the MFP shown in FIG. 2. The data processing unit 211 includes a PDL processing unit 401, a scanner image processing unit 402, an attribute information change unit 403, a compression processing unit 404, a storage device 405, a clear image processing unit 406, a UI unit 407, an image processing unit 408, a print control unit 409, and a clear synthesis unit 410.

Figure 5:
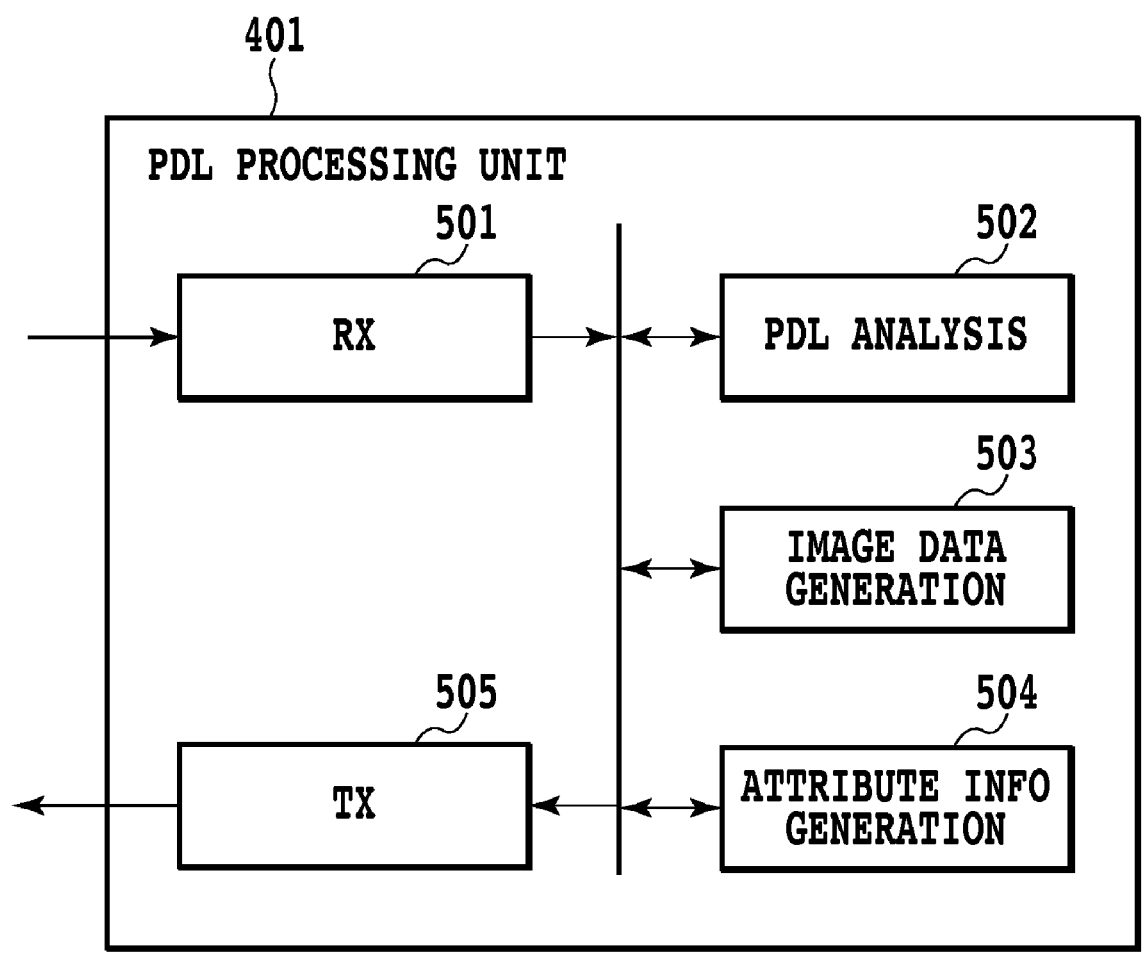
FIG. 5 is a diagram showing a configuration of a PDL processing unit.

FIG. 5 is a diagram showing a configuration of the PDL processing unit 401 shown in FIG. 4. The PDL processing unit 401 includes a receiving unit 501, a PDL analysis unit 502, an image data generation unit 503, an attribute information generation unit 504, and a transmission unit 505.

Figure 6:
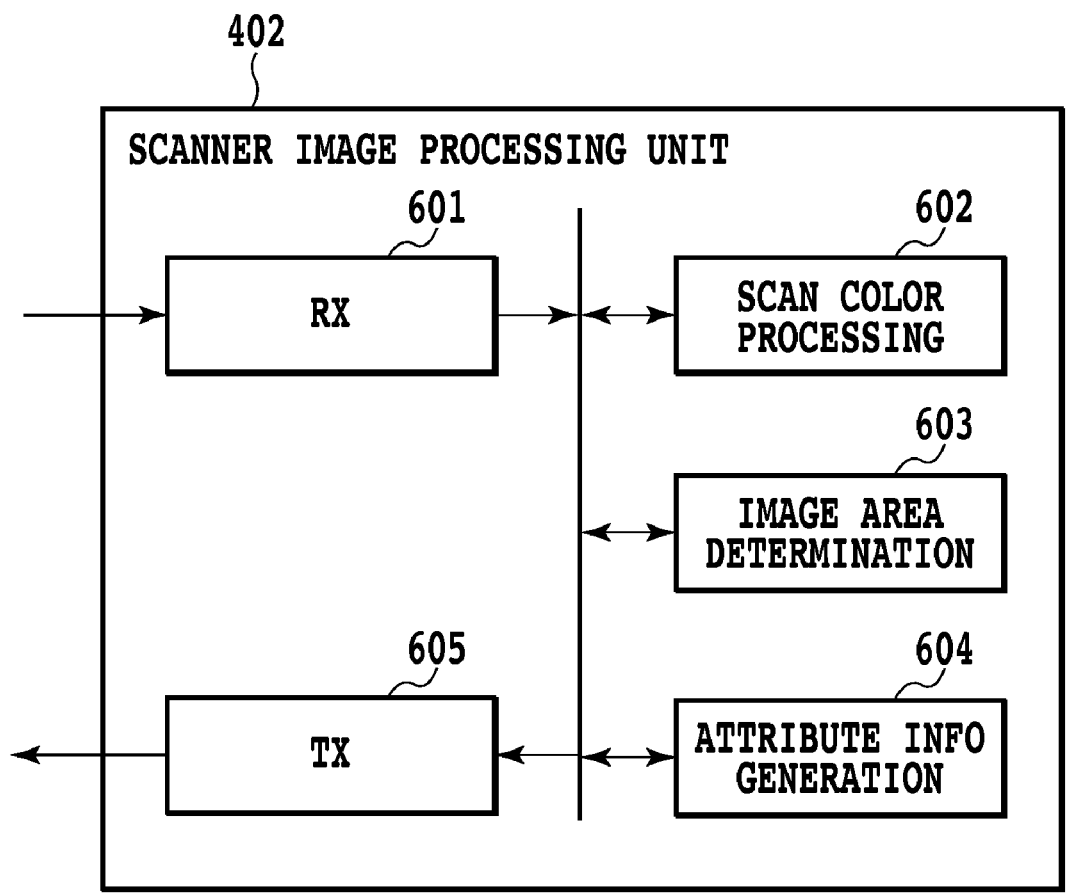
FIG. 6 is a diagram showing a configuration of a scanner image processing unit.

FIG. 6 is a diagram showing a configuration of the scanner image processing unit 402 shown in FIG. 4. The scanner image processing unit 402 includes a receiving unit 601, a scan color processing unit 602, an image area determination unit 603, an attribute information generation unit 604, and a transmission unit 605.

Figure 7:
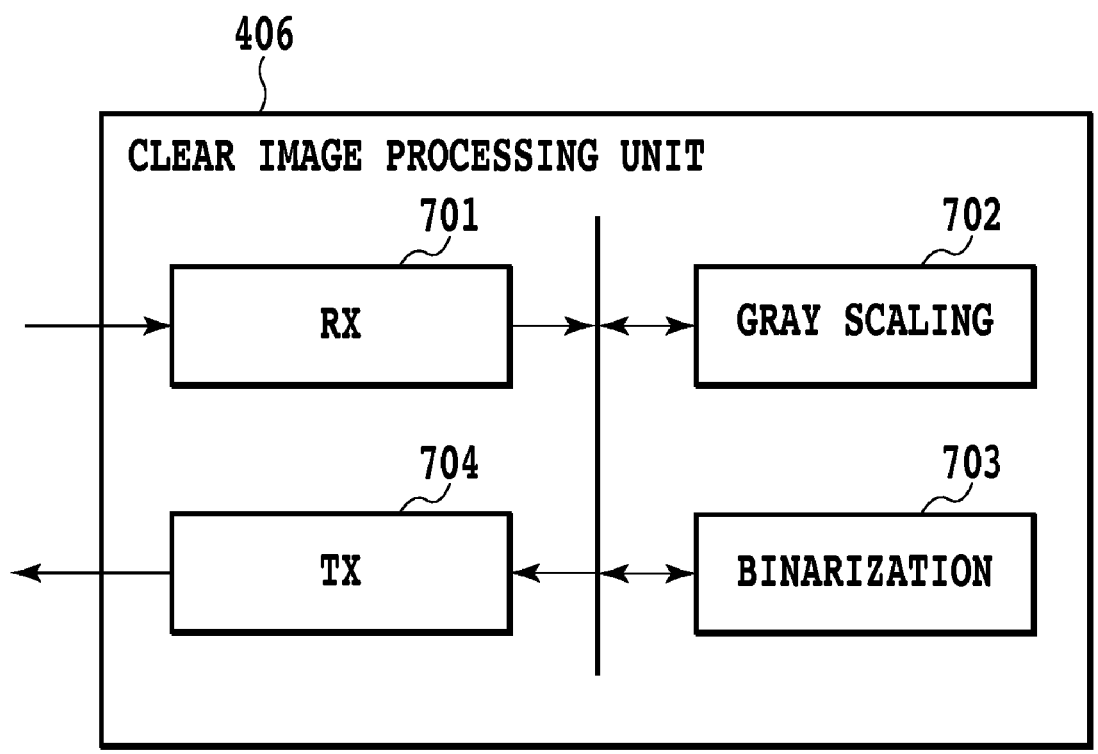
FIG. 7 is a diagram showing a configuration of a clear image processing unit.

FIG. 7 is a diagram showing a configuration of the clear image processing unit 406 shown in FIG. 4. The clear image processing unit 406 includes a receiving unit 701, a grayscaling unit 702, a binarization processing unit 703, and a transmission unit 704.

Figure 8:
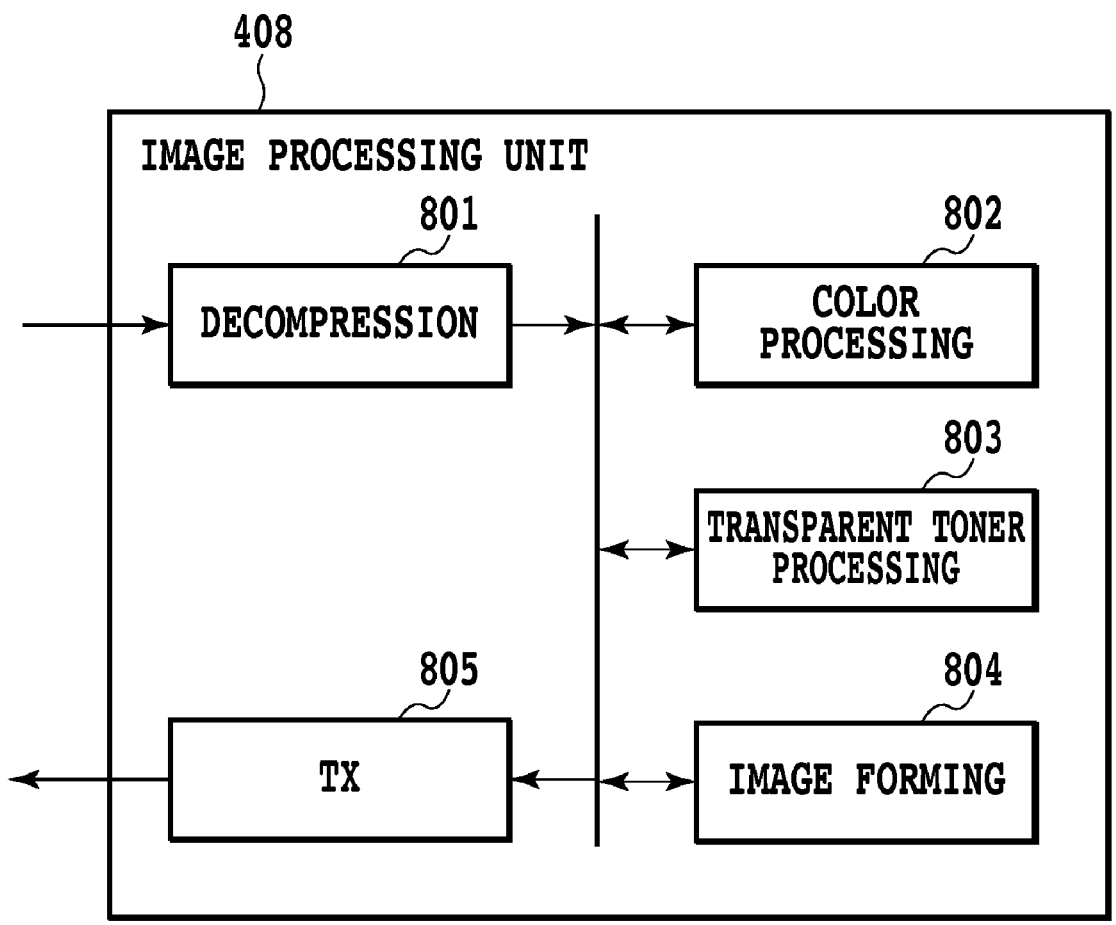
FIG. 8 is a diagram showing a configuration of an image processing unit.

FIG. 8 is a diagram showing a configuration of the image processing unit 408 shown in FIG. 4. The image processing unit 408 includes a data decompression unit 801, a print color processing unit 802, a transparent toner processing unit 803, an image formation processing unit 804, and a transmission unit 805.

[Clear Print Processing in Embodiment 1]

Figure 9:
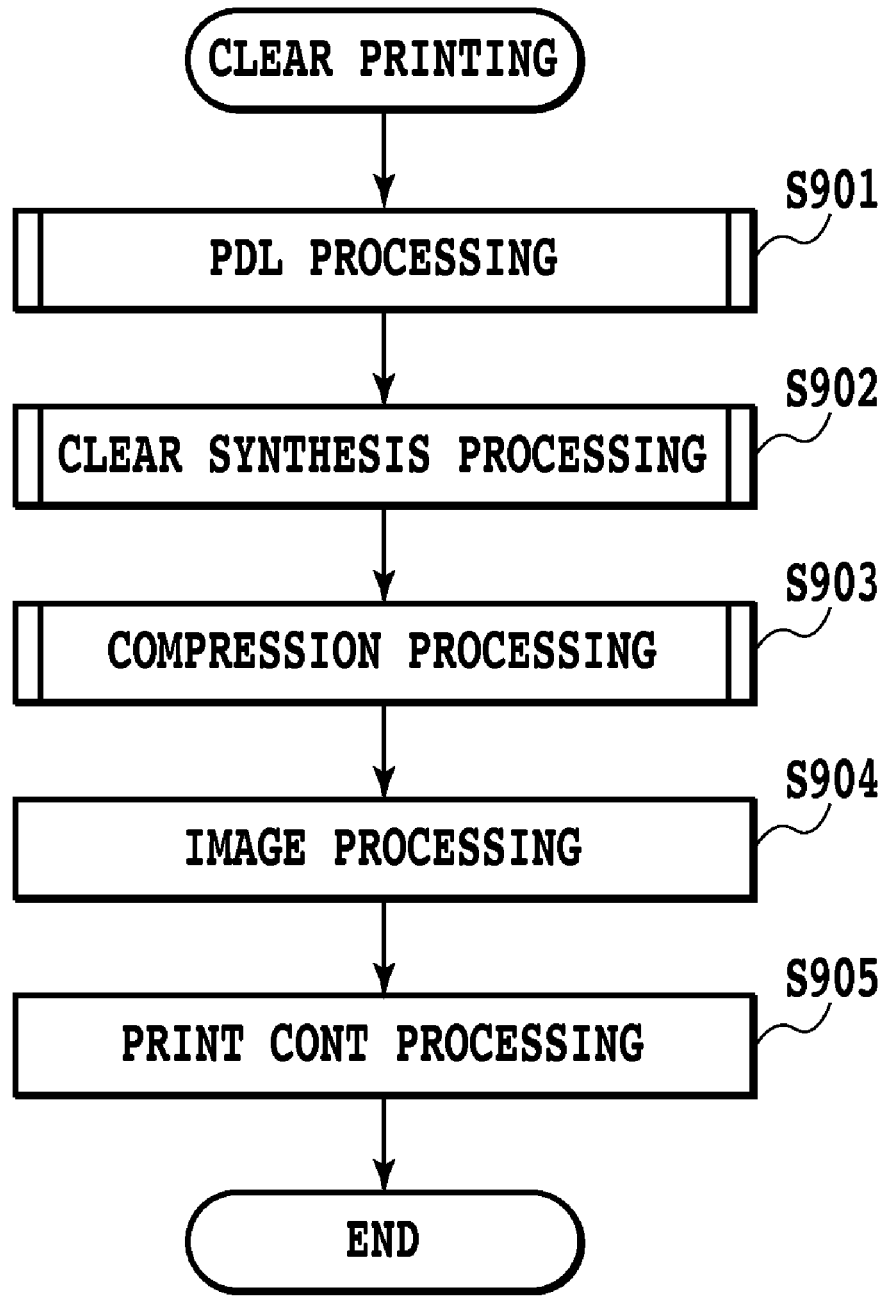
FIG. 9 is a flowchart showing a flow of clear print processing in Embodiments 1 to 3.
Figure 10:
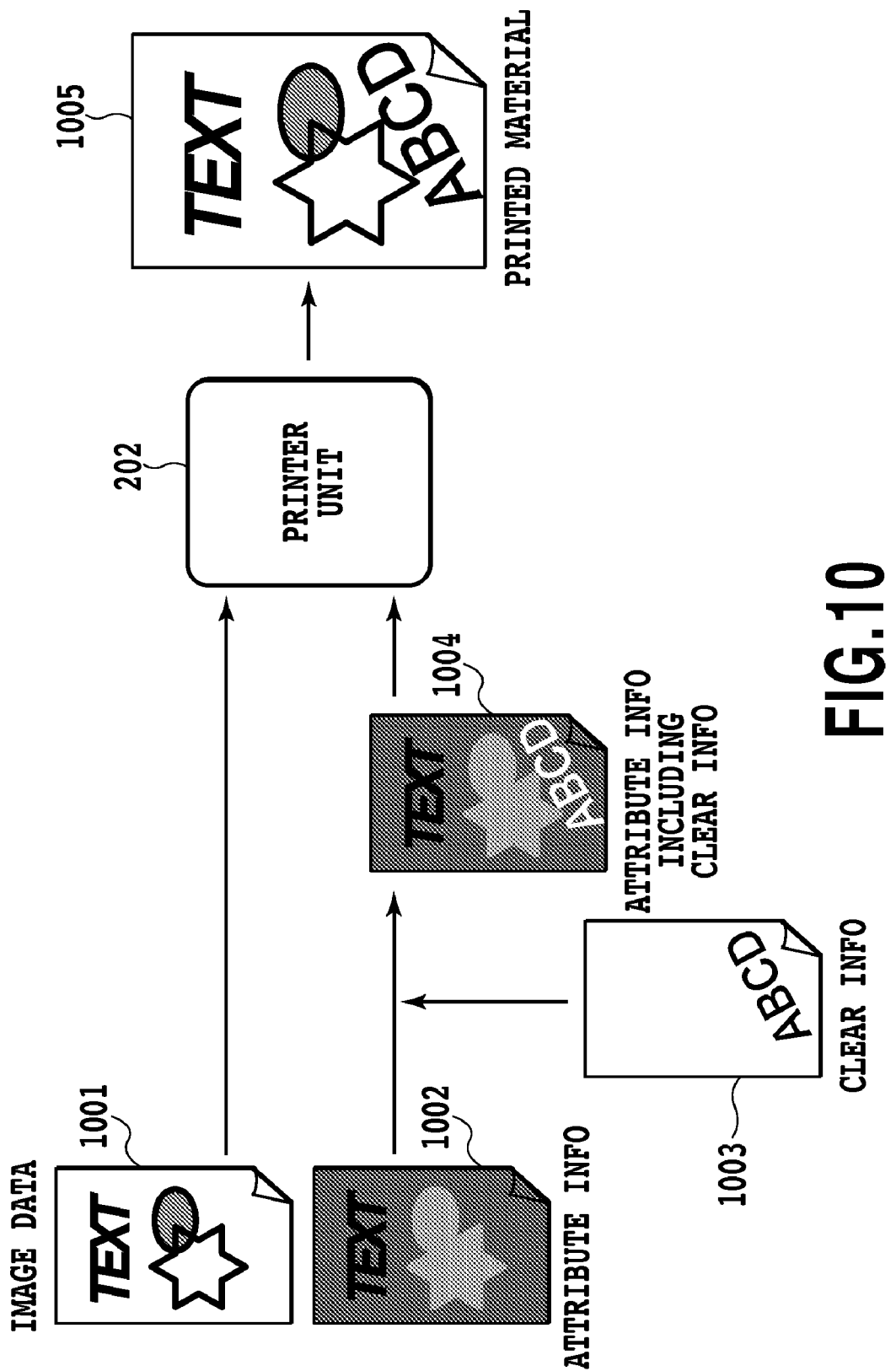
FIG. 10 is a conceptual diagram showing a data flow in clear print processing.

FIG. 9 is a flowchart showing a flow of clear print processing performed by the data processing unit 211. FIG. 10 is a diagram showing a data flow of the clear print processing.

In the clear print processing, first the PDL processing unit 401 receives PDL data transmitted from the local PC 102, or the MFP 101 or 103, analyzes the received PDL data, and generates image data 1001 and attribute information 1002 for each page (S901). Subsequently, the clear synthesis unit 410 combines a clear form (clear information) 1003 registered in the storage device 405 with the attribute information 1002 to generate clear information included attribute information 1004 (S902).

Next, the compression processing unit 404 compresses the image data 1001 and the clear information included attribute information 1004 so as to make the data amounts thereof smaller than respective predetermined storage capacities and stores the compressed data and information into the storage unit 405 (S903). Subsequently, the image processing unit 408 performs image processing such as color conversion and halftone processing (S904). In the image processing unit 408, the data decompression unit 801 takes out and decompresses the image data and the attribute information corresponding to the image data recorded in the storage unit 405. The print color processing unit 802 converts the color signal of the image data into the CMYBk signals according to the attribute information. The transparent toner processing unit 803 generates clear data from the clear information included attribute information 1004, and the transmission unit 805 transmits the clear data to the print control unit 409. The image formation processing unit 804 performs the halftone processing on the color-converted image data according to the attribute information, and generates print image data in accordance with an output gradation of the printer unit 202. The generated print image data is transmitted to the print control unit 409 by the transmission unit 805.

The print control unit 409 transmits the received print image data and clear data to the printer unit 202 (S905). The printer unit 202 carries out printing using the CMYBk toners and the transparent toner and outputs a printed material 1005.

Note that, for a scan image, the scan color processing unit 602 performs base processing and color processing on the scan image to generate image data. Further, the image area determination unit 603 carries out image area determination of a character and color/monochrome, and the attribute information generation unit 604 generates the attribute information according to the determination result of the image area.

[PDL Processing]

Figure 11:
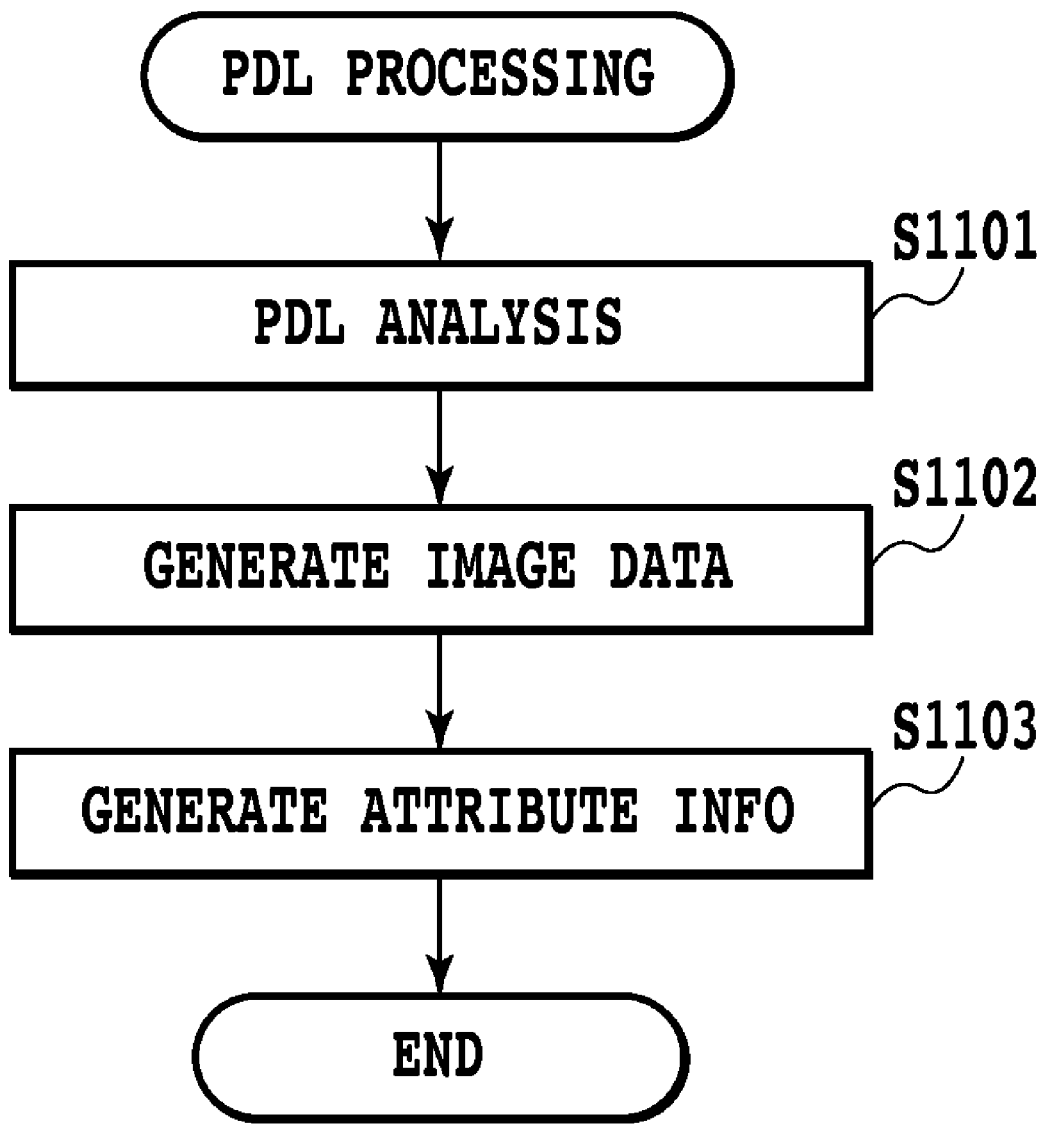
FIG. 11 is a flowchart showing a flow of PDL processing.

FIG. 11 is a flowchart showing a flow of the PDL processing performed by the PDL processing unit 401.

Figure 12B:
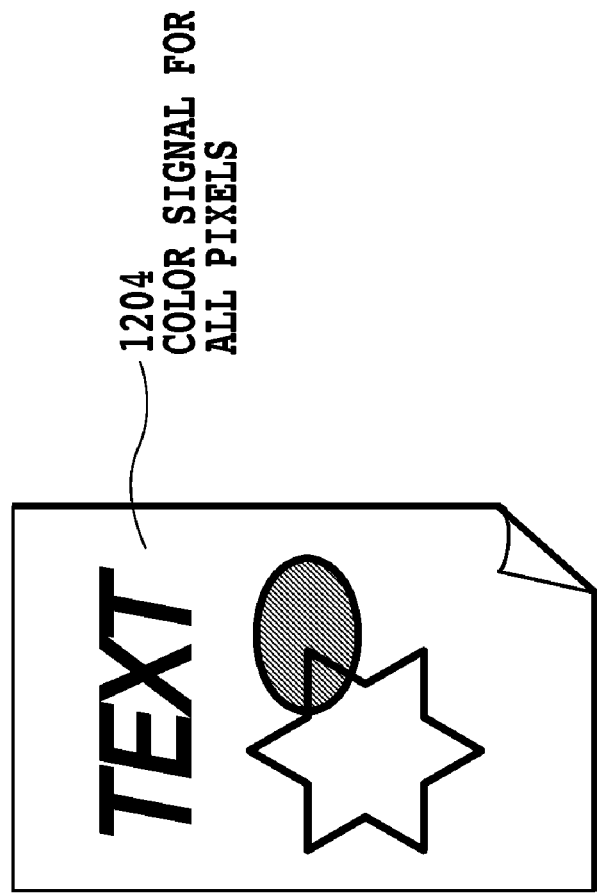
FIG. 12B is a diagram showing image data.
Figure 12A:
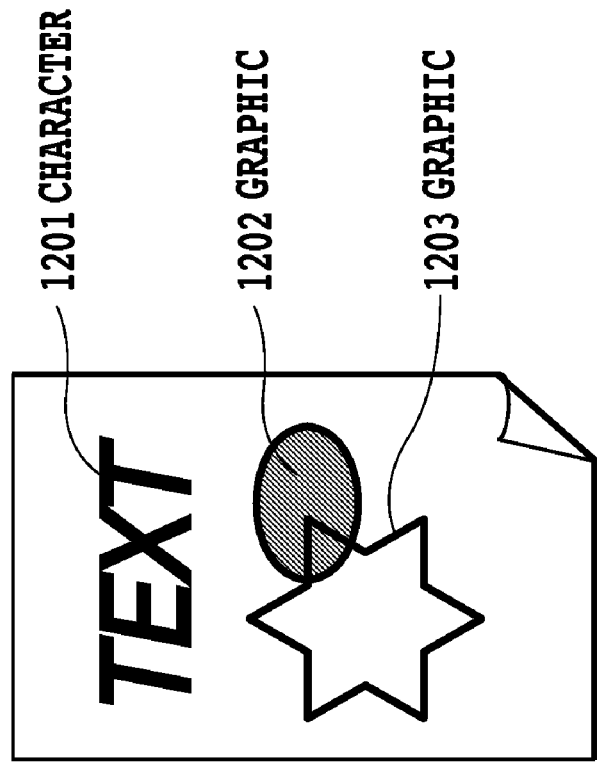
FIG. 12A is a diagram showing data generated by an application.

FIG. 12A is a diagram showing data generated by the application. This data includes a character 1201 and graphics 1202 and 1203, and the local PC 102 converts this data into PDL data and sends the PDL data to the MFP 101 when instructed to carry out printing by the UI 302 of the local PC 102. FIG. 12A shows an example of the data, and the data is not limited to data composed of a character and a graphic.

When the MFP 101 has received the PDL data, first the PDL analysis unit 502 analyzes the PDL data including a character, a graphic, an image, color designation, and other control orders (S1101). Next, the image data generation unit 503 carries out rendering according to the analyzed contents to generate image data composed of color signals such as RGB for each page (S1102). FIG. 12B is a diagram showing the image data generated in Step S1102, and the image data of FIG. 12B is composed of the color signal 1204 in all the pixels. Subsequently, the attribute information generation unit 504 generates attribute information corresponding to the image data from the analyzed contents of the PDL data and the image data (S1103).

Figure 13:
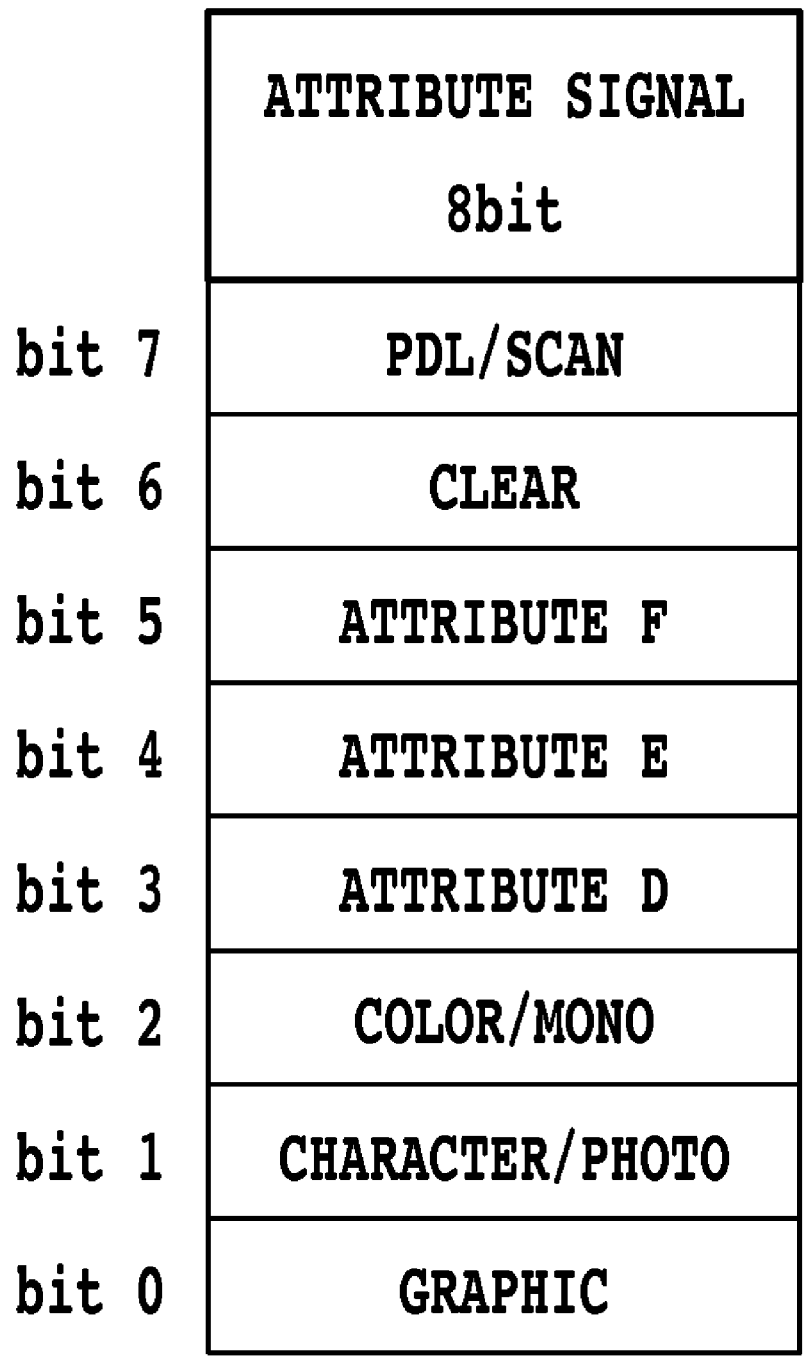
FIG. 13 is a diagram showing an attribute signal.
Figure 14:
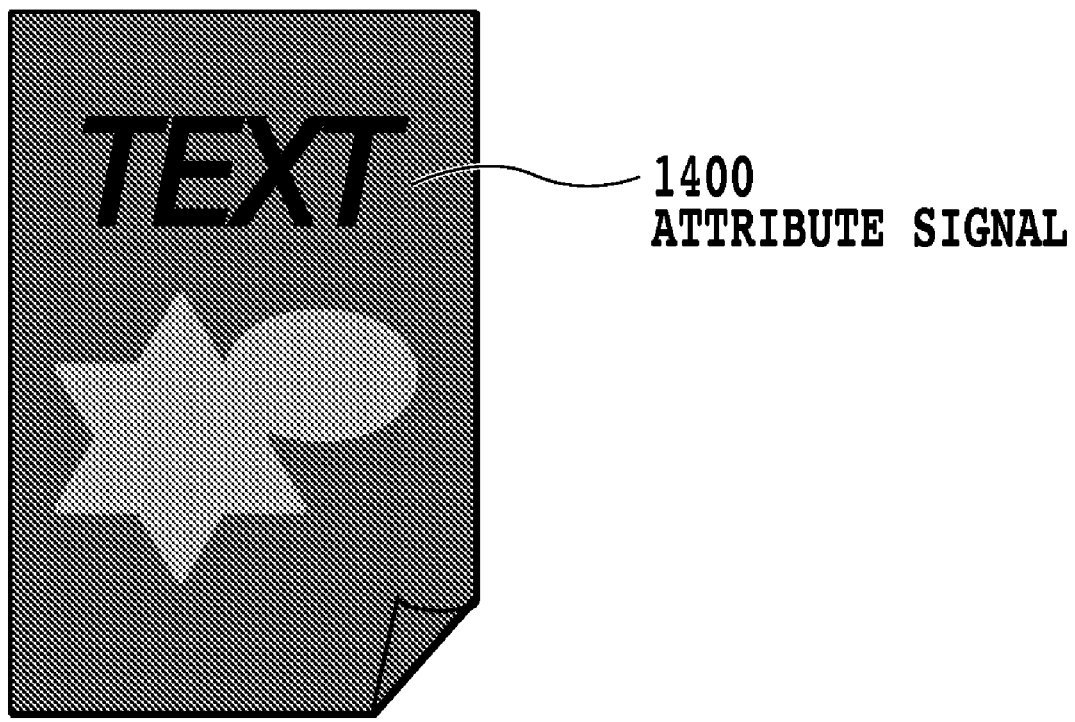
FIG. 14 is a diagram showing attribute information.

FIG. 13 shows an attribute signal. The attribute signal indicates an attribute of a corresponding pixel. For example, bit0 indicates whether a graphic or not, in which "1" indicates a pixel having a graphic and "0" indicates a pixel without a graphic. Bit1 indicates whether a character or an image, and bit2 indicates whether a chromatic color or an achromatic color. Each bit composing the attribute signal represents the attribute of the corresponding pixel by a bit value in this manner, and the attribute signal is stored. FIG. 14 is a diagram showing the attribute signal 1400 generated in Step S1103, and the attribute information includes the attribute signal corresponding to each pixel of the image data of FIG. 12B.

[Storage Device]

Figure 15:
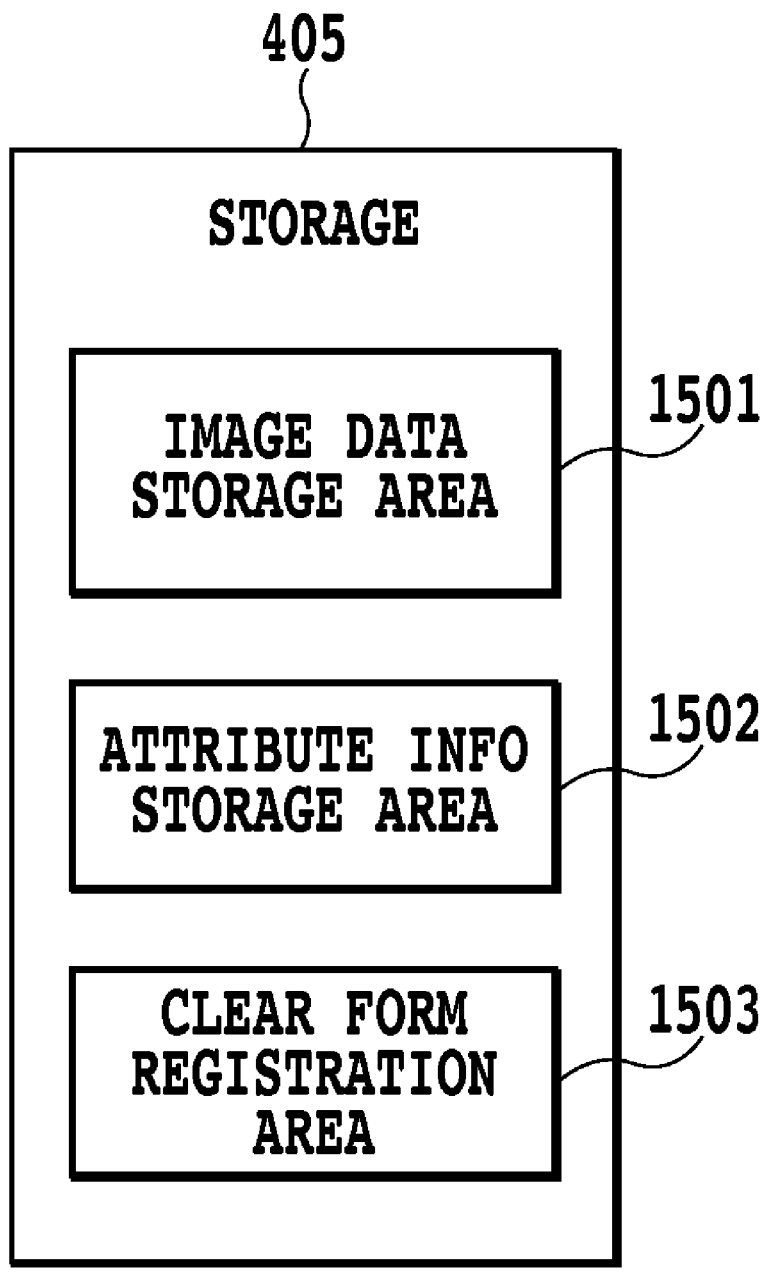
FIG. 15 is a diagram showing a configuration of a storage device.

FIG. 15 is a diagram showing a configuration of the storage device 405.

The storage device 405 includes an image data storage area 1501, an attribute information storage area 1502, and a clear form registration area 1503.

The image data storage area 1501 stores the image data generated by the image data generation unit 503 of the PDL processing unit 401 or the scan color processing unit 602 of the scanner image processing unit 402. The attribute information storage area 1502 stores the attribute information generated by the attribute information generation unit 504 of the PDL processing unit 401 or the attribute information generation unit 604 of the scanner image processing unit 402. A clear form generated by clear form registration processing is registered in the clear form registration area 1503, the processing is described hereinafter.

The memory capacity is limited for the data to be stored or registered in each of the areas, and the storage device 405 performs the compression processing on each of the data sets (image data, attribute information, and clear form) and stores the data sets by reducing each of the data amounts thereof to that smaller than the limit capacity.

[Clear Form Registration]

Clear printing uses clear form image data registered in the clear image processing unit 406 as the clear information.

Figure 16:
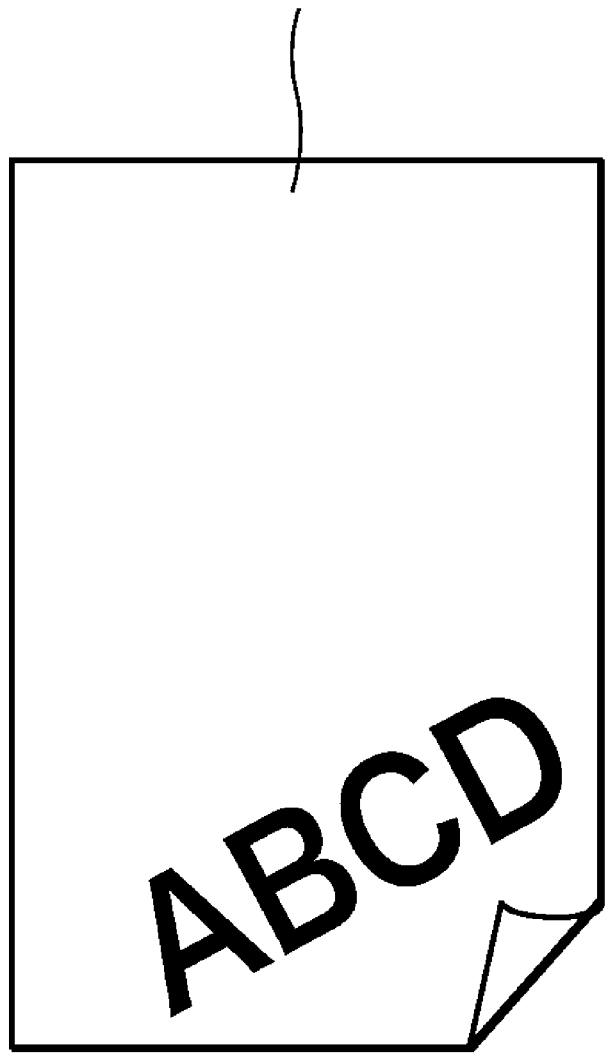
FIG. 16 is a diagram showing a clear image.
Figure 17:
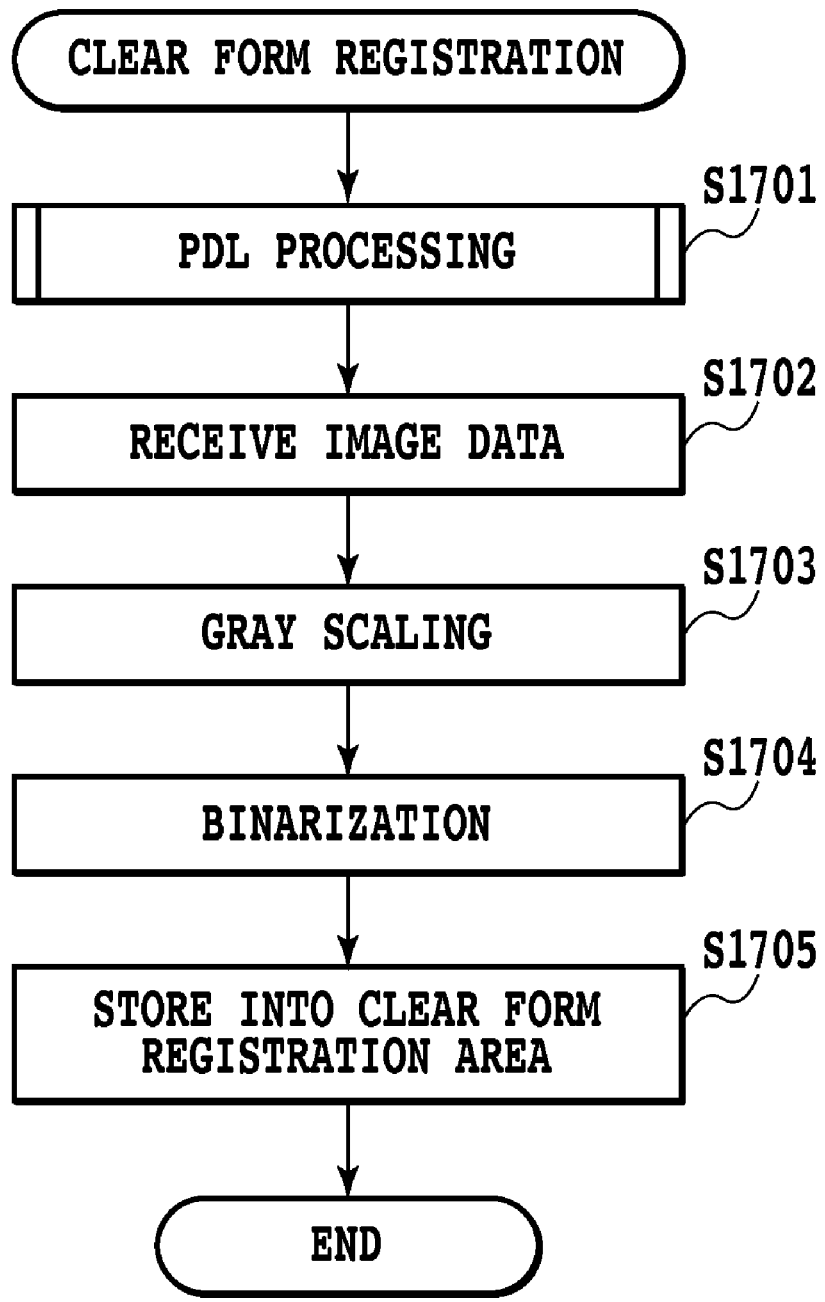
FIG. 17 is a flowchart showing a flow of clear form registration processing.

FIG. 16 is a diagram showing a clear image. FIG. 17 is a flowchart showing a flow of the clear form registration processing.

The local PC 102, when having received an instruction of clear form image registration from a driver UI screen (not shown in the drawing), converts the clear data 1601 into PDL data and transmits the converted PDL data to the PDL processing unit 901.

In the clear form registration processing, first the PDL processing unit 901 receives the PDL data and generates image data in the above described PDL processing (FIG. 11) (S1701). The clear image processing unit 406 receives the generated image data (S1702) and the gray-scaling unit 702 performs gray-scaling for converting the image data into gray scale data (S1703). While the conversion method includes, for example, a method which converts an input RGB signals into YUV signals and uses only the Y signal as a gray scale signal, the conversion method is not limited to this method.

Following the gray-scaling, the binarization processing unit 703 converts the gray-scaled image data into binary image data (S1704). The conversion method includes, for example, a method which sets a threshold value and generates the binary image data by setting one for a gray scale signal value larger than the threshold value and setting zero for a gray scale signal value smaller than the threshold value. The transmission unit 805 transmits the generated binary image data to the storage device 405 and registers the binary image data as a clear form in the clear form registration area 1503 of the storage device 405 (S1705).

[Clear Synthesis Processing]

Figure 18:
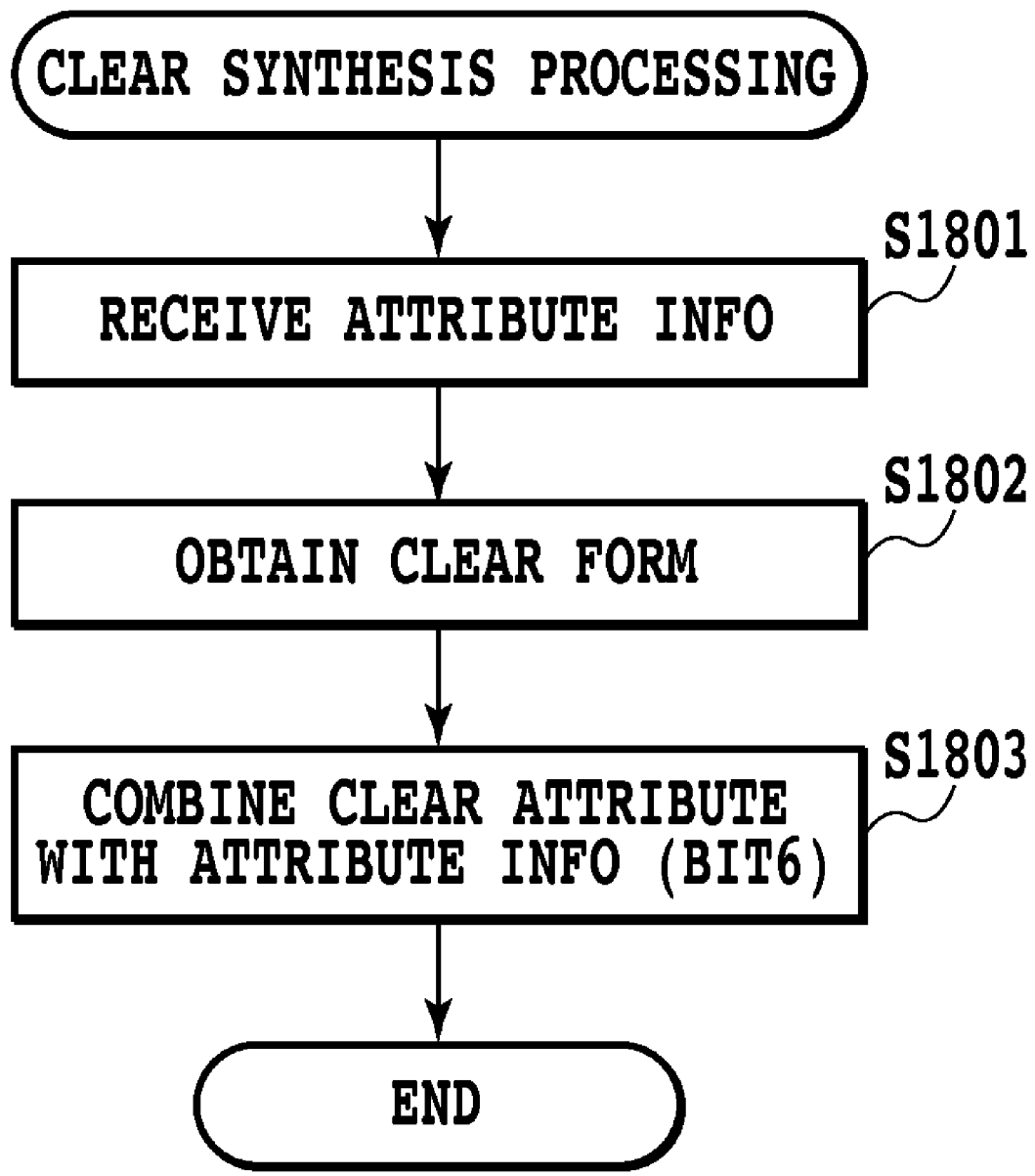
FIG. 18 is a flowchart showing a flow of clear synthesis processing.

FIG. 18 is a flowchart showing a flow of clear synthesis processing performed by the clear synthesis unit 410.

First, the clear synthesis unit 410 receives the attribute information generated by the attribute information generation unit 504 of the PDL processing unit 401 (S1801), and obtains a clear form registered in the clear form registration area 1503 of the storage device 405 (S1802). The clear synthesis unit 410 generates clear information included attribute information by combining the clear form information with the received attribute information (S1803). For example, when the attribute information has an attribute configuration shown in FIG. 13, clear attribute is indicated by bit6. The synthesis processing is performed as follows; the clear synthesis unit 410 takes out an attribute signal (8 bits) of the attribute information and the clear form value at the same pixel position, and generates the clear information included attribute information by writing "0" for a clear form value of "0" and "1" for a clear form value of "1" into the attribute signal bit6 of the attribute information for all the pixels.

Figure 19:
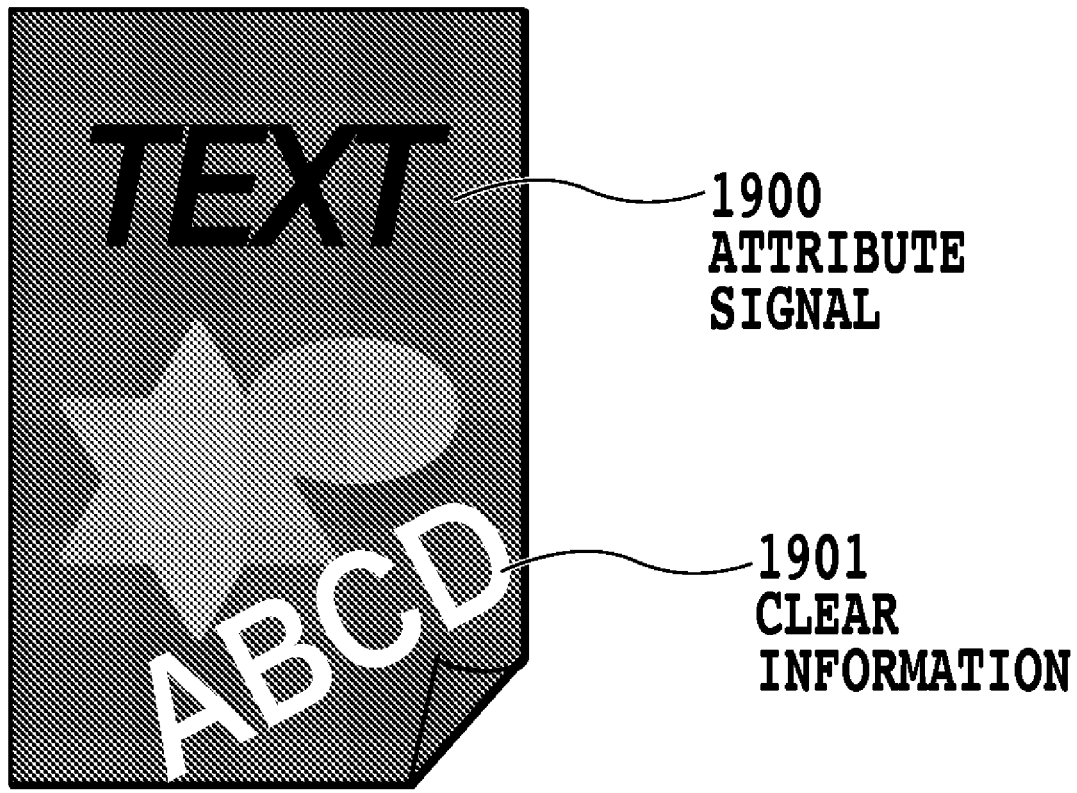
FIG. 19 is a diagram showing an attribute signal including clear information.

FIG. 19 is a diagram showing the attribute signal including the clear information.

The attribute signal 1900 including the clear information 1901 of FIG. 19 is generated by the combination of the clear data 1601 shown in FIG. 16, which has been registered as a clear form, with the attribute signal shown in FIG. 14.

[Compression Processing]

The image data which is generated in the image data generation unit 503 and the clear information included attribute information which is generated in the clear synthesis unit 410 are stored into the image data storage area 1501 and the attribute information storage area 1502 of the storage device 405, respectively. Each of the areas has a limit of memory capacity capable of recording the data, and each of the image data and the attribute information is subjected to compression processing in the compression processing unit 404 and stored after the data amount thereof has been reduced to that smaller than the limit capacity of the corresponding storage area.

The image data is compressed by the JPEG compression which is lossy compression providing little visual deterioration and also capable of realizing a high degree of compression, and stored into the image data storage area 1501 after the data amount thereof has been reduced to that smaller than the limit capacity of the image data storage area 1501.

The attribute information, each bit of which represents corresponding attribute, is compressed by lossless compression to prevent an attribute loss and stored into the attribute information storage area 1502 after the information amount thereof has been reduced to that smaller than the limit capacity of the attribute information storage area 1502.

Figure 20:
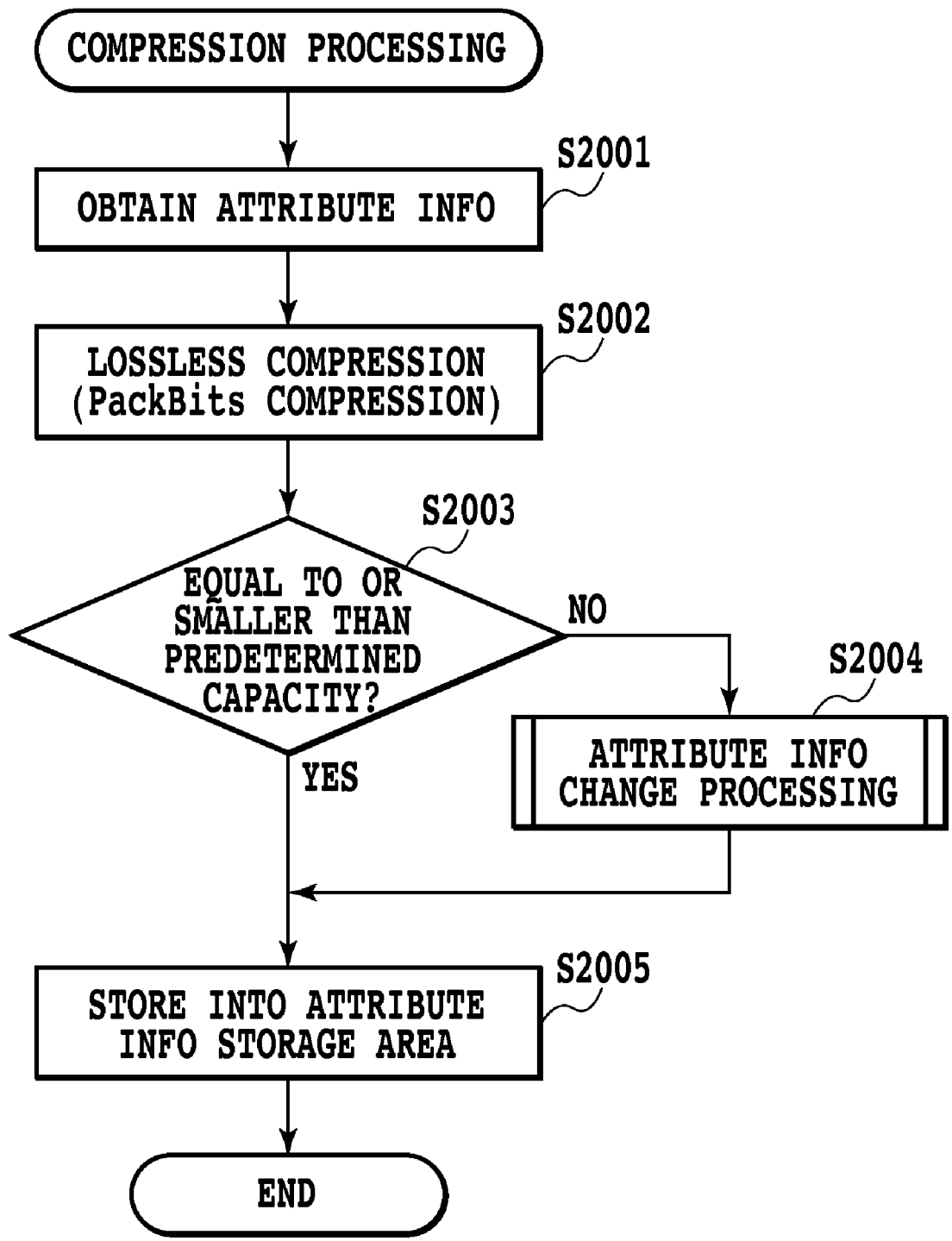
FIG. 20 is a flowchart showing a flow in a compression processing unit.

FIG. 20 is a flowchart showing a flow of the compression processing performed by the compression processing unit 404.

In the compression processing of the attribute information by the compression processing unit 404, first the compression processing unit 404 obtains the clear information included attribute information which was generated in the clear synthesis unit 410 (S2001), and compresses the attribute information by the PackBits compression which is lossless compression (S2002). Next, the compression processing unit 404 determines whether the data amount of the compressed attribute information is equal to or smaller than a predetermined memory capacity which is a limit capacity of the attribute information storage area 1502 (S2003). If the data amount exceeds, the predetermined memory capacity in the determination result, the compression processing unit 404 performs attribute information change processing for changing the attribute information so as to make the data amount equal to or smaller than the predetermined memory capacity (S2004), and stores the compressed attribute information into the attribute information storage area 1502 (S2005).

On the other hand, if the data amount is equal to or smaller than the predetermined memory capacity in Step S2003, the compression processing unit 404 does not perform the attribute information change processing and performs the storage processing of Step S2005.

[Attribute Information Change Processing in Embodiment 1]

Figure 21:
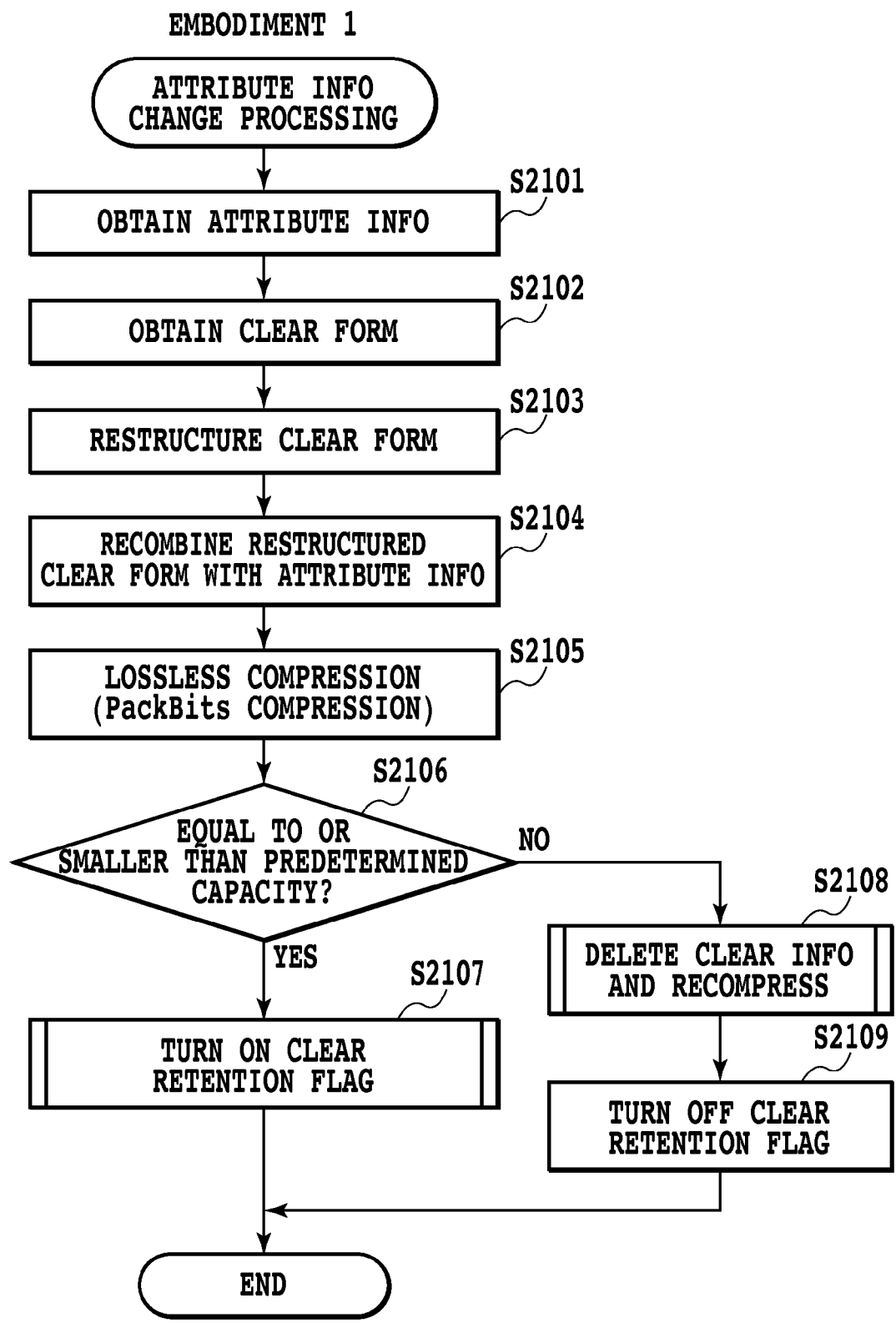
FIG. 21 is a flowchart showing a flow of attribute information change processing in Embodiment 1.

FIG. 21 is a flowchart showing a more detailed flow of the attribute information change processing in Embodiment 1 (S2004) performed by the compression processing unit 404 in the compression processing (FIG. 20).

In the attribute information change processing, first the compression processing unit 404 receives the attribute information generated by the attribute information generation unit 504 of the PDL processing unit 401 (S2101) and obtains the clear form registered in the clear form registration area 1503 of the storage device 405 (S2102). Next, the compression processing unit 404 restructures the clear form so as to increase a compression rate of the lossless compression for the attribute information (S2103). For the restructuring of the clear form, since the lossless compression has a feature of getting a higher compression rate as the same data continues, for example, in the case of the PackBits compression, the compression processing unit 404 carries out down sampling to reduce the data resolution of the clear form.

Figure 22A:
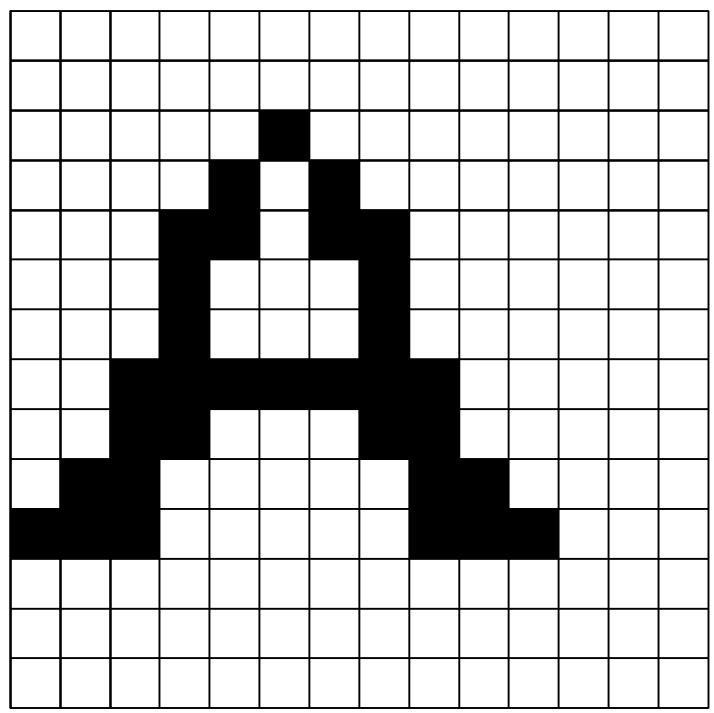
FIG. 22A is a diagram showing a part of a clear form registered in 600 dpi.
Figure 22B:
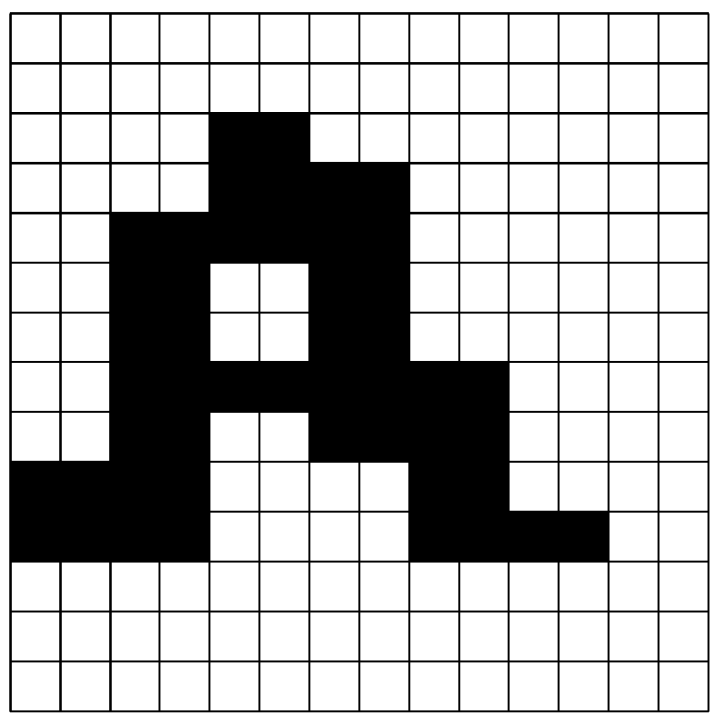
FIG. 22B is a diagram showing a part of a clear form subjected to down sampling.

FIG. 22A shows a part of the clear form generated and registered in a resolution of 600 dpi the same as that of the image data. The compression processing unit 404 carries out the down sampling to reduce the horizontal resolution of the clear form of FIG. 22A down to 300 dpi, and generates data having the original resolution of 600 dpi by simply doubling the 300 dpi data (arranging the same two data sets continuously) (FIG. 22B) for restructuring the clear form. The rate of the continued same data is increased by simply doubling the 300 dpi data, and it is possible to carry out the PackBits compression in a high compression rate.

Next, the compression processing unit 404 combines the restructured clear form with the attribute information again the same as the clear synthesis unit 410 (S2104), and compresses the attribute information including the restructured clear information which has been obtained by the restructuring and re-synthesis carried out preferentially (S2105). Then, the compression processing unit 404 determines whether the data amount of the compressed attribute information is equal to or smaller than the limit capacity of the attribute information storage area 1502 (S2106). If the data amount is equal to or smaller than the predetermined capacity in the determination result, the compression processing unit 404 turns on a clear retention flag which indicates whether the clear information is retained in the attribute information (retention) (S2107) and terminates the attribute information change processing.

On the other hand, if the data amount exceeds the predetermined capacity in Step S2106, the compression processing unit 404 deletes the clear information from the attribute information and compresses the attribute information again (S2108), and terminates the attribute information change processing after turning off the clear retention flag (no retention) (S2109).

As described above, by restructuring the clear information in the case that the data amount of the attribute information exceeds the limit capacity and by reducing the data amount of the attribute information to that equal to or smaller than the limit capacity, it is possible to increase the compression rate of the attribute information while retaining the clear information. As a result, it is possible to increase the possibility of carrying out printing using the basic four colors and the transparent toner.

[Embodiment 2]

Embodiment 1 restructures the clear information in the attribute information change processing in order to reduce the data amount of the attribute information to that equal to or smaller than a predetermined capacity. The present embodiment has a feature of changing an attribute except the clear information in the attribute information.

[Attribute Information Change Processing in Embodiment 2]

Figure 23:
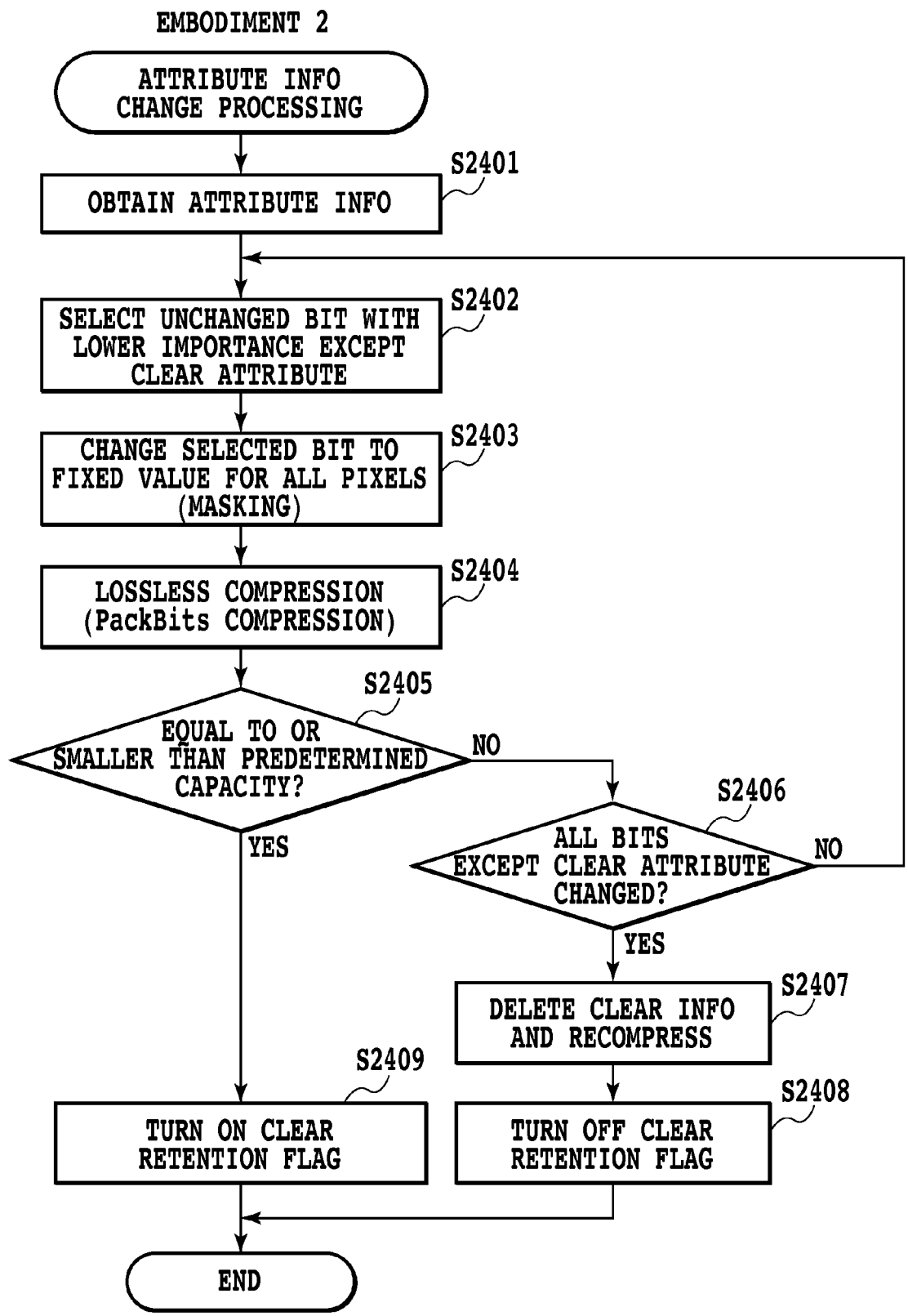
FIG. 23 is a flowchart showing a flow of attribute information change processing in Embodiment 2.

FIG. 23 is a flowchart showing a flow of the attribute information change processing in Embodiment 2 performed by the compression processing unit 404 in the compression processing (FIG. 20).

In the attribute information change processing, the compression processing unit 404 first receives the attribute information including the clear information generated by the clear synthesis unit 410 (S2401), and selects a bit with a lower importance level from among unchanged attributes except the clear attribute (except particular toner information) in the attribute signals of the attribute information (S2402). FIG. 25 is a diagram showing the importance level of the attribute signal. For example, the importance level of the attribute is preliminarily determined in a manner such that a higher importance level is set for an attribute showing an object composing pixels such as Character/Photograph (bit1) and Graphic (bit0) and a lower importance level is set for an additional attribute such as Color/Monochrome (bit2).

The compression processing unit 404, after having selected the bit with a lower importance level, performs bit mask processing for changing the value of the selected bit to a fixed value ("0" or "1") (S2403), and carries out the PackBits compression for the attribute information subjected to the mask processing (S2404). In the lossless compression processing by the PachBits compression, it is possible to increase the compression rate by setting the bits selected by the mask processing to have the same values.

Next, the compression processing unit 404 determines whether the data amount of the compressed attribute information is equal to or smaller than the limit capacity of the attribute information storage area 1502 (S2405). If the data amount is equal to or smaller than the predetermined limit capacity in the determination result, the compression processing unit 404 turns on the clear retention flag which indicates whether the attribute information retains the clear information (retention) (S2409) and terminates the attribute information change processing.

On the other hand, if the data amount exceeds the predetermined limit capacity in Step S2405, the compression processing unit 404 determines whether or not all the values of the bits except the clear attribute have been changed to fixed values (subjected to the mask processing) (S2406). If all the bit values are not changed to the fixed values in the determination result, the compression processing unit 404 returns to Step S2402 for performing the mask processing on an attribute having a next lower importance level.

On the other hand, if all the bit values except that of the clear attribute are subjected to the change processing (mask processing) in Step S2406, the compression processing unit 404 deletes the clear information from the attribute information and carries out the compression again (S2407). Further, the compression processing unit 404 turns off the clear retention flag (no retention) (S2408) and terminates the attribute information change processing.

Figure 26:
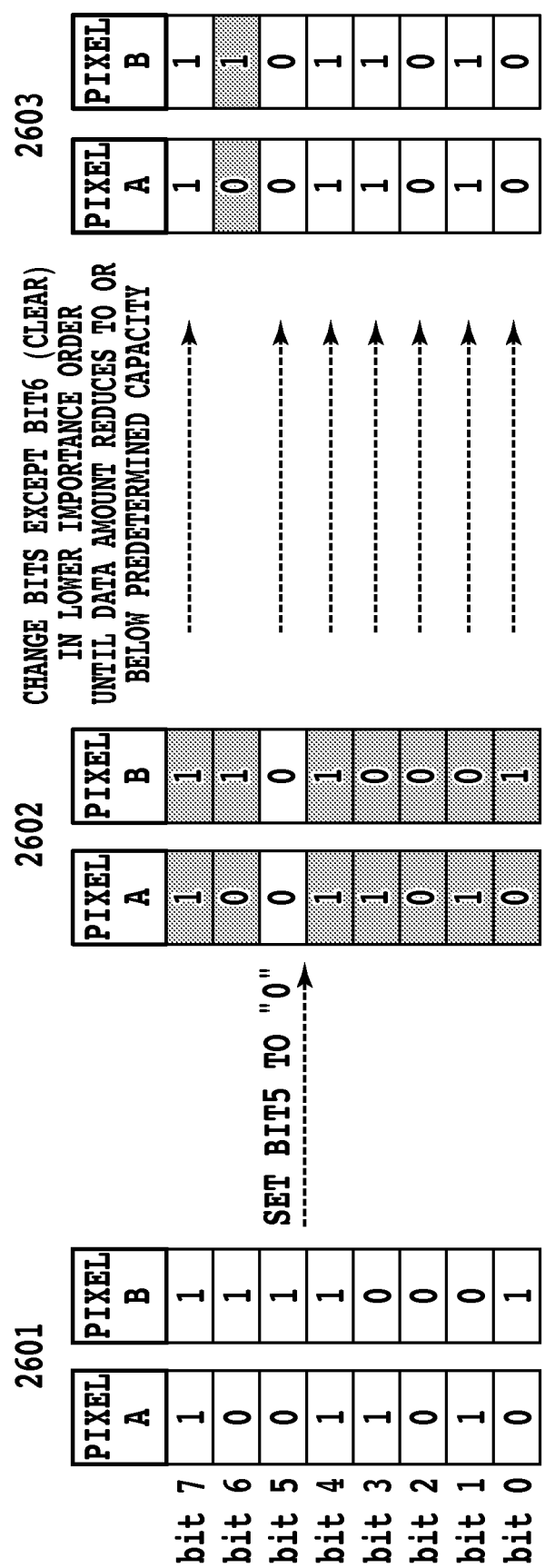
FIG. 26 is a diagram showing an attribute information change by mask processing in Embodiment 2.

FIG. 26 is a diagram illustrating the attribute information change by the mask processing.

For the attribute signal value 2601 for each of any pixels A and B in the attribute information, the compression processing unit 404 first selects bit5 having the lowest importance level (importance level is 1) in Step S2402, and changes the value of bit5 to a fixed value of "0" for each of the pixels A and B in Step 2403 (2602). The compression processing unit 404 compresses the data in Step S2404 and selects bit3 having a next lower importance level (importance level is 2) when the data amount exceeds the predetermined capacity. The compression processing unit 404 similarly selects the bit, bit4 and then bit2, in the order of lower importance level until the data amount reduces to or below the predetermined capacity, and changes the attribute information by sequentially replacing the bit value (2603).

As described above, for the reduction of the data amount for the attribute information to that equal to or smaller than a predetermined capacity, the data amount is reduced by the mask processing for the attribute except the clear attribute (except the particular toner information), and it becomes possible to increase the compression rate of the attribute information while retaining the clear information. As a result, it is possible to increase the possibility of carrying out the printing using the basic four colors and the transparent toner.

Figure 24:
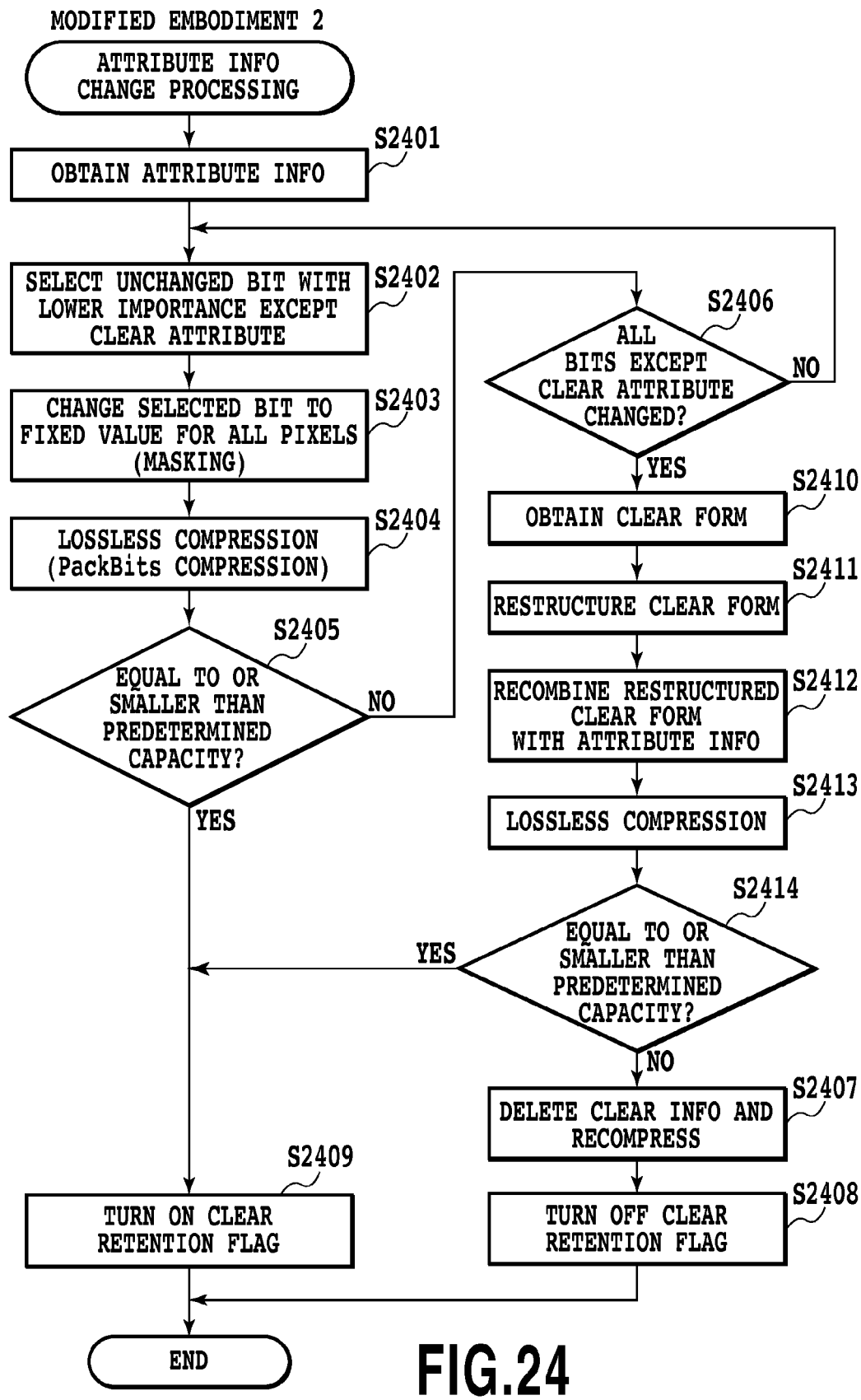
FIG. 24 is a flowchart showing a flow of improved attribute information change processing in Embodiment 2.

Note that, as shown in FIG. 24, the compression processing unit 404 may restructure the clear information (S2410 to S2414) as in Embodiment 1 after the processing described in the present embodiment, that is, after having performed the mask processing on the attribute except the clear attribute (except the particular toner information) in order to reduce the data amount of the attribute information to that equal to or smaller than a predetermined capacity.

[Embodiment 3]

For reducing the data amount of the attribute information to that equal to or smaller than a predetermined capacity, Embodiment 1 restructures the clear information in the attribute information change processing, and Embodiment 2 changes the attribute except the clear information in the attribute information. The present embodiment has a feature of restructuring the clear information and changing the attribute except the clear information.

[Attribute Information Change Processing in Embodiment 3]

Figure 27:
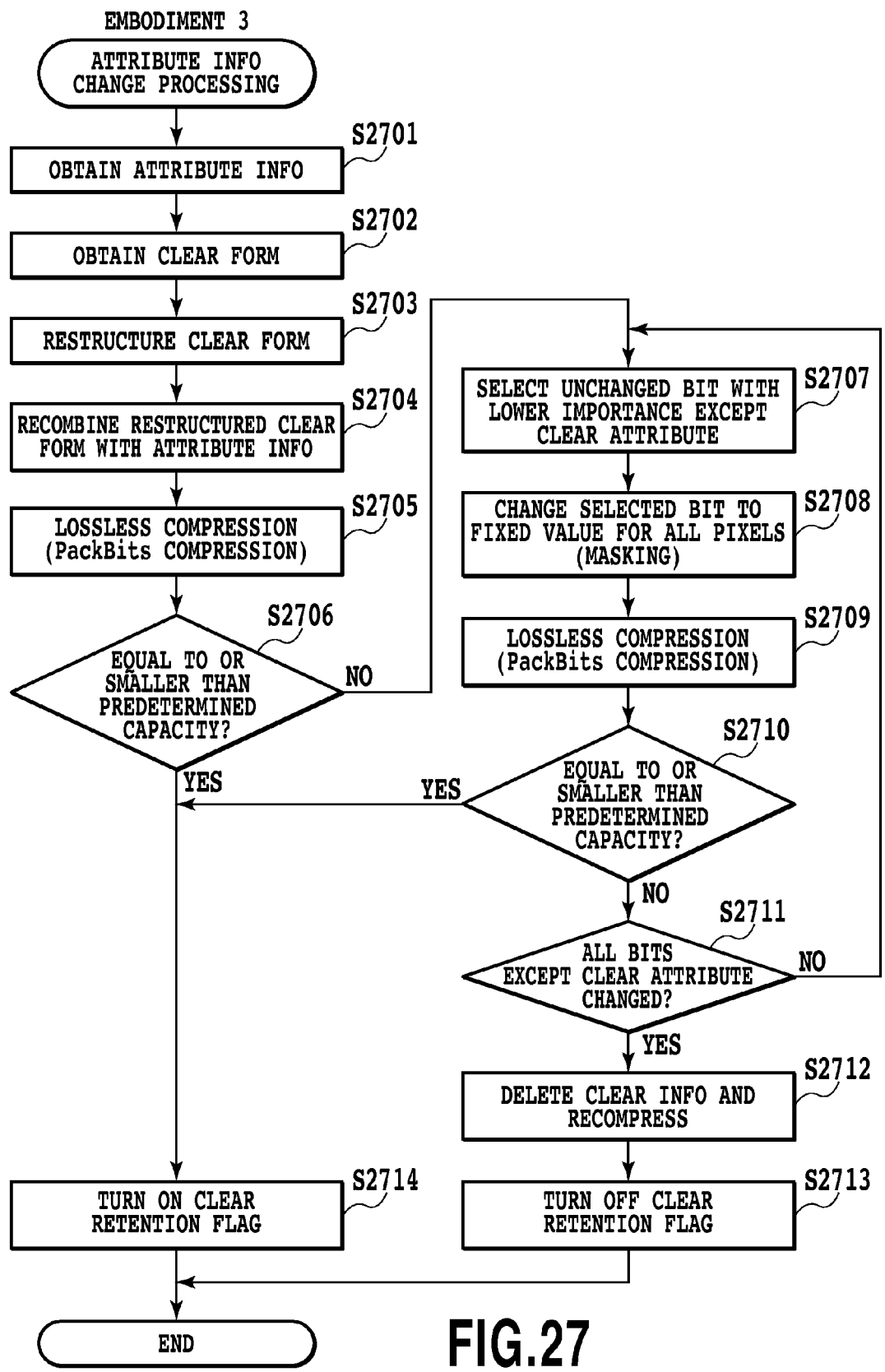
FIG. 27 is a flowchart showing a flow of attribute information change processing in Embodiment 3.

FIG. 27 is a flowchart showing a flow of the attribute information change processing S2004 performed by the compression processing unit 404. The present processing combines processing (S2701 to S2706 and S2714) similar to the processing of Step S2101 to S2107 in the attribute information change processing of Embodiment 1 and processing (S2707 to S2713) similar to the processing of Step S2402 to S2408 in the attribute information change processing of Embodiment 2.

In the present attribute information change processing, first the compression processing unit 404 receives the attribute information generated by the attribute information generation unit 504 of the PDL processing unit 401 (S2701), and obtains the clear form registered in the clear form registration area 1503 of the storage device 405 (S2702). Next, the compression processing unit 404 restructures the clear form so as to increase the compression rate of the lossless compression for the attribute information (S2703). For the restructuring of the clear form, the compression processing unit 404 carries out down sampling to reduce the data resolution of the clear form, since the lossless compression has a feature of getting a higher compression rate as the same data continues, for example, in the case of the PackBits compression.

Next, the compression processing unit 404 combines the restructured clear form information and the attribute information again the same as the clear synthesis unit 410 (S2704), and compresses the attribute information including the restructured clear information which has been obtained by the restructuring and re-synthesis carried out preferentially (S2705). Then, the compression processing unit 404 determines whether the data amount of the compressed attribute information is equal to or smaller than the limit capacity of the attribute information storage area 1502 (S2706). If the data amount is equal to or smaller than the predetermined capacity in the determination result, the compression processing unit 404 turns on a clear retention flag which indicates whether the clear information is retained in the attribute information (retention) (S2714) and terminates the attribute information change processing. The processing up to this step is the same as the attribute information change processing of Embodiment 1 as described above.

On the other hand, if the data amount is determined to exceed the predetermined capacity in Step 2706, the compression processing unit 404 performs processing similar to the attribute information change processing of Embodiment 2 as described above, replacing Step S2108 to Step S2109 in the attribute information change processing of Embodiment 1.

That is, if the data amount exceeds the predetermined capacity in Step S2706, the compression processing unit 404 selects a bit with a lower importance level from among the unchanged attributes except the clear attribute in the attribute signals of the attribute information including the restructured clear information (S2707). After having selected a bit with a lower importance level, the compression processing unit 404 performs the bit mask processing for changing the value of the selected bit to a fixed value ("0" or "1") (S2708), and performs the PackBits compression on the mask-processed attribute information (S2709). It is possible to increase the compression rate by setting the bits selected by the mask processing to have the same value.

Next, the compression processing unit 404 determines whether or not the data amount of the compressed attribute information is equal to or smaller than the limit capacity of the attribute information storage area 1502 (S2710). If the data amount is equal to or smaller than the predetermined limit capacity in the determination result, the compression processing unit 404 turns on the clear retention flag which indicates whether the attribute information retains the clear information (retention) (S2714) and terminates the attribute information change processing.

On the other hand, if the data amount exceeds the predetermined limit capacity in Step S2710, the compression processing unit 404 determines whether or not all the values of the bits except the clear attribute has been changed to fixed values (subjected to the mask processing) (S2711). If all the bit values are not changed to the fixed values in the determination result, the compression processing unit 404 returns to Step S2707 for performing the mask processing on an attribute having a next lower importance level.

On the other hand, if all the bit values except that of the clear attribute are subjected to the change processing (mask processing) in Step S2711, the compression processing unit 404 deletes the clear information from the attribute information and carries out the compression again (S2712). Further, the compression processing unit 404 turns off the clear retention flag (no retention) (S2713) and terminates the attribute information change processing.

As described above, in the present embodiment, by restructuring the clear information in order to reduce the data amount of the attribute information to that equal to or smaller than a predetermined capacity and further performing the mask processing on the attribute except the clear attribute, it becomes possible to increase the compression rate of the attribute information while retaining the clear information. As a result, it is possible to increase the possibility of carrying out the printing using the basic four colors and the transparent toner.

<Embodiment 4>

In the present embodiment, there will be described an aspect of clear print processing when the data amount of the attribute information exceeds the predetermined capacity after the attribute information change processing is performed.

[Clear Print Processing in Embodiment 4]

Figure 28:
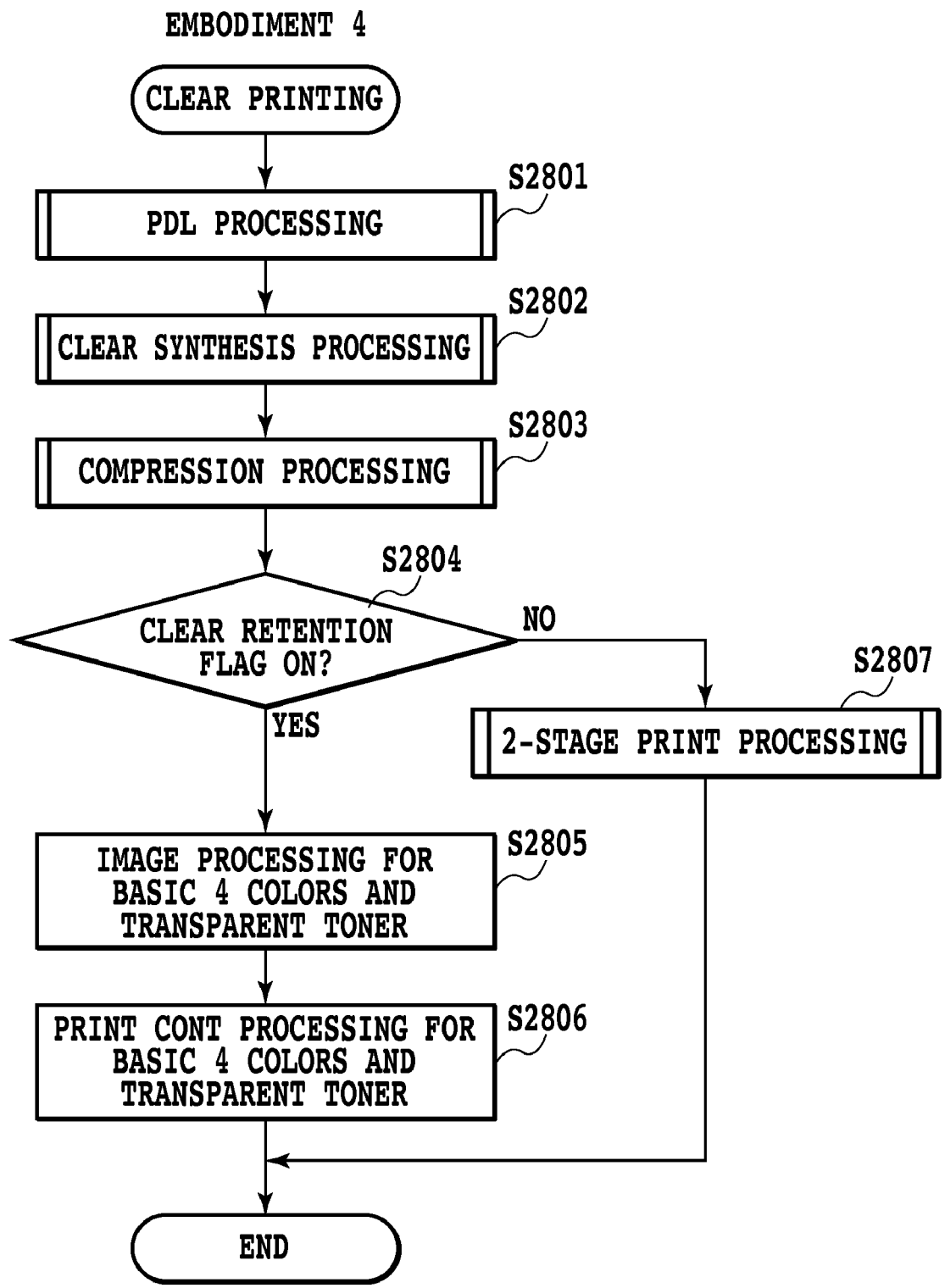
FIG. 28 is a flowchart showing a flow of clear printing in Embodiment 4.

FIG. 28 is a flowchart showing a flow of the clear print processing performed by the data processing unit 211.

First, the PDL processing unit 401 receives the PDL data transmitted from the local PC 102 or the MFP 101 or 103, and generates the image data and the attribute information for each page by analyzing the received PDL data (S2801). Next, the clear synthesis unit 410 combines the clear form (clear information) registered in the storage device 405 and the attribute information to generate the attribute information including the clear information (S2802). Subsequently, the compression processing unit 404 compresses the image data 1001 and the clear information included attribute information 1004 so as to reduce the data amounts thereof to those smaller than the capacities of the image data storage area 1501 and the attribute information storage area 1502, respectively, and stores the compressed data and information into the storage device (S2803).

Next, the data processing unit 211 determines whether the clear retention flag set in the attribute information change processing S2004 performed by the compression processing unit 404 is "ON" or "OFF" (S2804). "ON" of the clear retention flag indicates that the attribute information retaining the clear information has been stored in the attribute information storage area 1502 in the attribute information change processing, and "OFF" indicates that the attribute information without the clear information is stored in the attribute information storage area 1502.

Accordingly, if the clear retention flag is "ON" in Step S2804 (the clear information is retained in the attribute information), the data processing unit 211 obtains the image data 1001 and the clear information included attribute information 1004 which are recorded in the storage device 405 and performs image processing thereon. This image processing generates print image data of the basic four colors and clear data (S2805). The print control unit 409 transmits the generated print image data of the basic four colors and the clear data to the printer unit 202 (S2806). The printer unit 202, after having received the print data of the basic four colors and the particular toner, carries out printing using the CMYBk toners and the transparent toner and outputs the printed material 1005.

On the other hand, if the clear retention flag is "OFF" in Step S2804 (case that the clear information is deleted from the attribute information), two-stage print processing is carried out as follows (S2807).

[Two-stage Print Processing]

Figure 29:
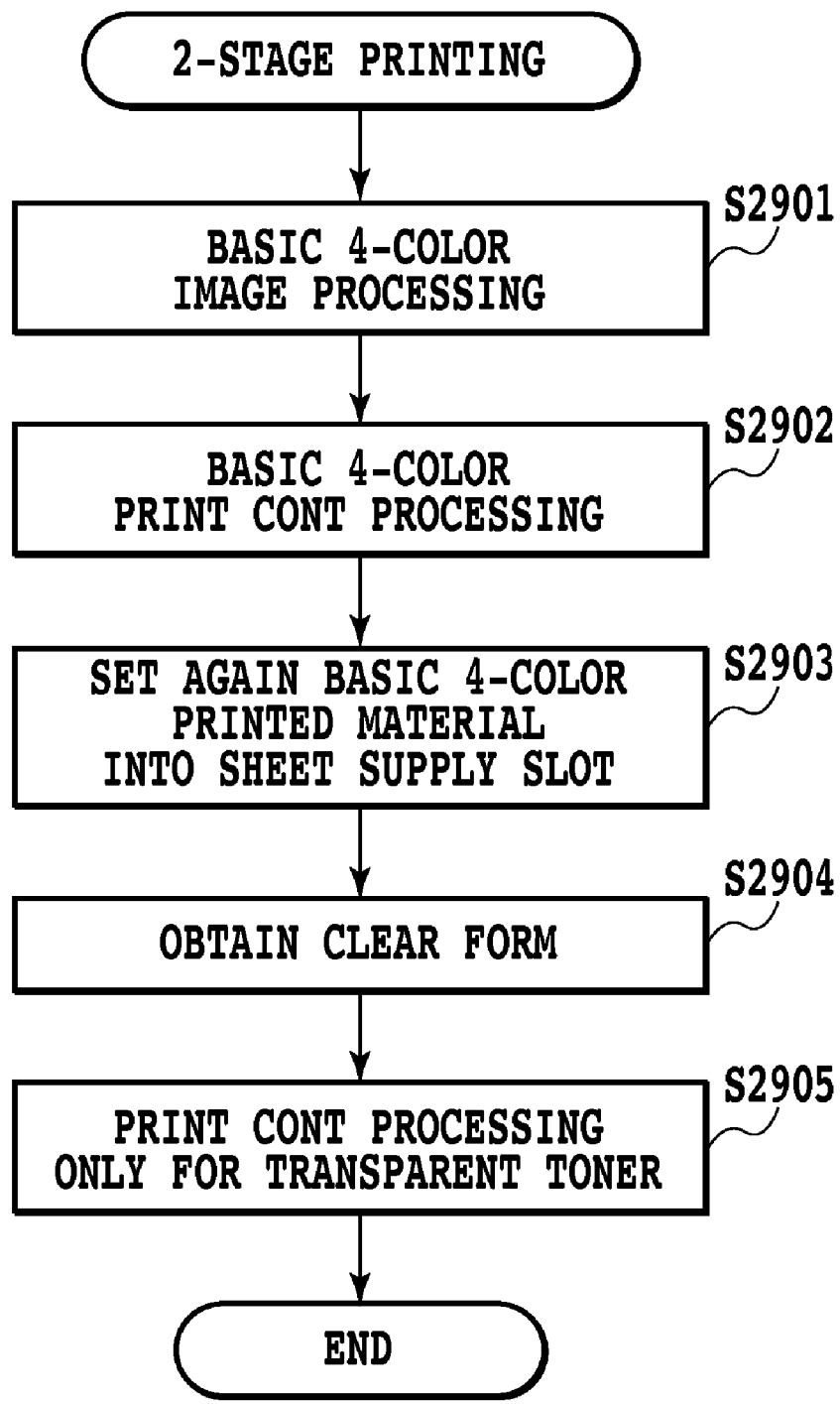
FIG. 29 is a flowchart showing a flow of two-stage printing in Embodiment 4.
Figure 30:
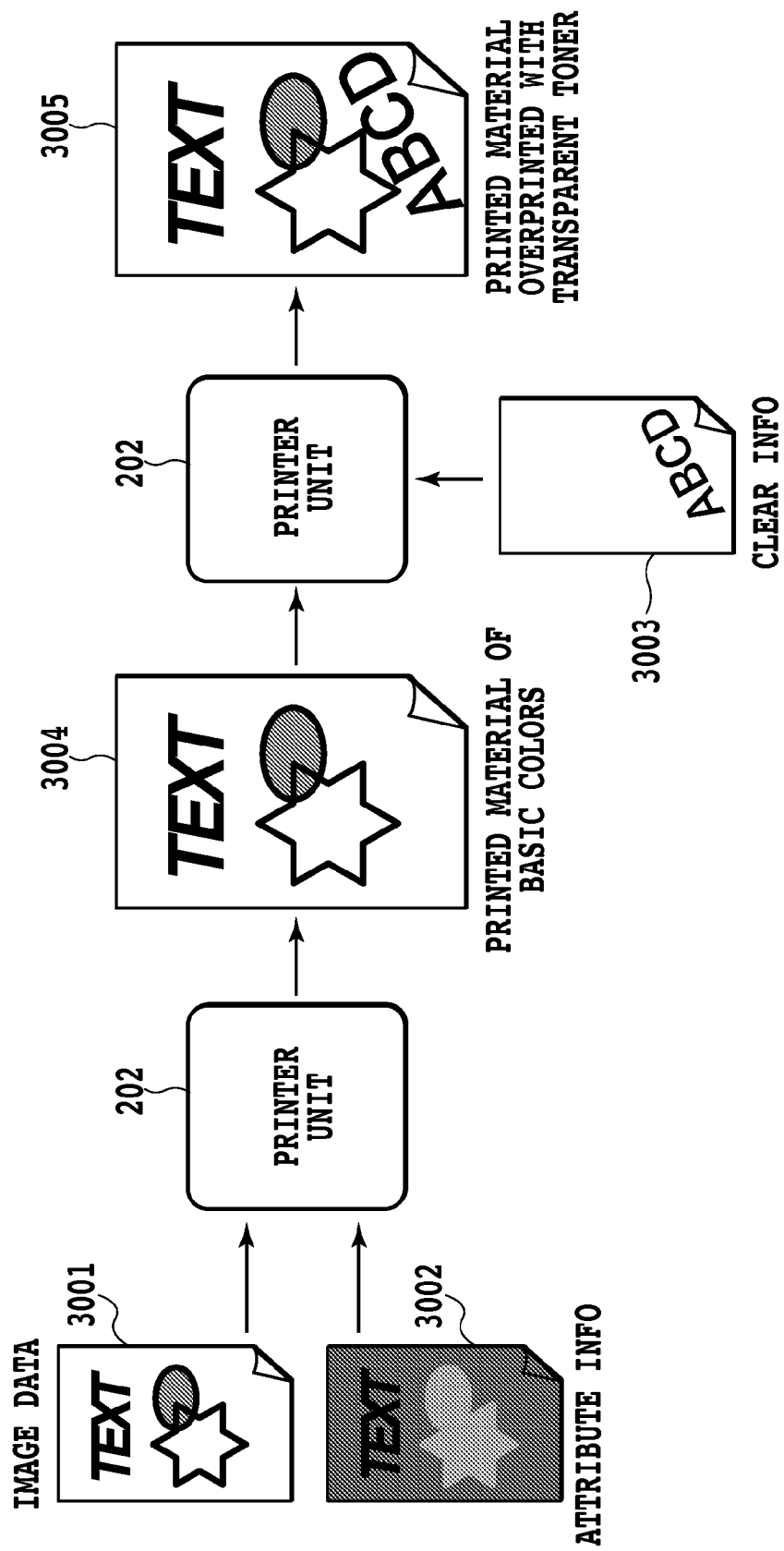
FIG. 30 is a conceptual diagram showing a data flow of the two-stage printing in Embodiment 4.

FIG. 29 is a flowchart showing a flow of the two-stage print processing. FIG. 30 is a diagram showing a data flow in the two-stage print processing.

In the two-stage print processing, first the data processing unit 211 obtains the image data 3001 and the clear information cancelled attribute information 3002 which are recorded in the storage device 405 and performs the image processing thereon to generate the print image data of the basic four colors (S2901). The print control unit 409 transmits the generated print image data of the basic four colors to the printer unit 202, and carries out the printing of a full color image in the basic four colors using the CMYBk toners and outputs a printed material 3004 (S2902).

Next, after the printed material 3004 printed in the basic four colors has been set again in a sheet supply slot of the sheet cassette 225 or the sheet cassette 226 of the MFP 101 (S2903), the data processing unit 221 then obtains the clear form (clear information) 3003 registered in the clear form registration area 1503 of the storage device 405 (S2904), and the print control unit 409 transmits the clear information to the printer unit 202 as the print image data. The printer unit 202 carries out printing again on the printed material 3004 printed in the basic four colors to print a particular toner image using only the transparent toner, and outputs a printed material 3005 which is overprinted with the transparent toner (S2905).

As described above, even when the capacity of the attribute information cannot be reduced to that equal to or smaller than the storage capacity of the storage area while the clear information is being retained, it is possible to securely carry out the transparent toner printing by the two-stage print processing of the present embodiment.

[Other Embodiments]

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-059578, filed Mar. 12, 2009, which is hereby incorporated by reference herein in its entirety.

What is claimed is:

1. An image processing apparatus that forms an image with color toners and a particular toner different from the color toners, wherein the color tanners are used for full color printing of cyan, magenta, yellow and black, the apparatus comprising:
    a storage component configured to store image data and attribute information indicating an attribute of each pixel in said image data;
    a compression component configured to compress said attribute information;
    a change component configured to change attribute information except particular toner information for forming an image with said particular toner of said attribute information, so that a data amount of said compressed attribute information does not exceed a storage capacity of said storage component, when a data amount of the compressed attribute information exceeds the storage capacity;
    a component configured to store the attribute information changed by said change component into said storage component; and
    a component configured to form a full color image and a particular toner image by performing image processing using said attribute information stored in said storage component for said image data stored in said storage component.

2. The apparatus according to claim 1, wherein said change component comprises a restructuring component configured to restructure said particular toner information and a component configured to change said attribute information by recombining the particular toner information restructured by said restructuring component with each pixel in said attribute information.

3. The apparatus according to claim 1, wherein said change component comprises a component configured to change said attribute information by replacing a value except said particular toner information included in said attribute information.

4. The apparatus according to claim 1, wherein said change component comprises
    a component configured to change said attribute information by replacing a value except said particular toner information included in said attribute information,
    a restructuring component configured to restructure said particular toner information, and
    a recombining component configured to recombine the particular toner information restructured by said restructuring component with each pixel in said attribute information.

5. The apparatus according to claim 4, wherein said change component further comprises a recompressing component configured to recompress said attribute information changed.

6. The apparatus according to claim 5, further comprising:
a component configured to form a full color image by performing image processing according to said attribute information on the image data stored in said storage component, when a data amount of the attribute information compressed by said recompressing component exceeds said storage capacity of said storage component; and
a component configured to form an image with a particular toner on the formed full color image according to said particular toner information.

7. An image processing apparatus that forms an image with color toners and a particular toner different from the color toners, wherein the color tonners are used for full color printing of cyan, magenta, yellow and black, the apparatus comprising:
a change component configured to change attribute information except particular toner information for forming an image with said particular toner of image data and attribute information indicating an attribute of each pixel in said image data to reduce a data amount;
a component configured to store the attribute information changed by said change component into a storage component; and
a component configured to form a full color image and a particular toner image by performing image processing using said attribute information stored in said storage component for said image data.

8. A controlling method implemented in an image processing apparatus that forms an image with color toners and a particular toner different from the color tonners, wherein the color toners are used for full color printing of cyan, magenta, yellow and black, the method comprising the steps of:
storing image data and attribute information indicating an attribute of each pixel in said image data into a storage;
compressing said attribute information;
changing attribute information except particular toner information for forming an image with said particular toner of said attribute information, so that a data amount of said compressed attribute information does not exceed a storage capacity of said storage, when a data amount of the compressed attribute information exceeds the storage capacity;
storing the attribute information changed in said change step into said storage; and
forming a full color image and a particular toner image by performing image processing using said attribute information stored in said storage for said image data stored in said storage.

9. A controlling method implemented in an image processing apparatus that forms an image with color toners and a particular toner different from the color toners, wherein the color toners are used for full color printing of cyan, magenta, yellow and black, the method comprising the steps of:
changing attribute information except particular toner information for forming an image with said particular toner of image data and attribute information indicating an attribute of each pixel in said image data to reduce a data amount;
storing the attribute information changed in said change step into a storage; and
forming a full color image and a particular toner image by performing image processing using said attribute information stored in said storage for said image data.

10. A non-transitory computer-readable medium storing thereon a computer program for controlling method of an image processing apparatus that forms an image with color toners and a particular toner different from the color tonners, wherein the color toners are used for full color printing of cyan, magenta, yellow and black, the program causing a computer to execute the steps of:
storing image data and attribute information indicating an attribute of each pixel in said image data into a storage;
compressing said attribute information;
changing attribute information except particular toner information for forming an image with said particular toner of said attribute information, so that a data amount of said compressed attribute information does not exceed a storage capacity of said storage, when a data amount of the compressed attribute information exceeds the storage capacity;
storing the attribute information changed by said change component into said storage; and
forming a full color image and a particular toner image by performing image processing using said attribute information stored in said storage for said image data stored in said storage.

* * * * *